United States Patent
Adachi et al.

(10) Patent No.: US 9,467,593 B2
(45) Date of Patent: Oct. 11, 2016

(54) NON-TRANSITORY STORAGE MEDIUM STORING INSTRUCTIONS EXECUTABLE BY INFORMATION PROCESSING DEVICE, INFORMATION PROCESSING DEVICE, AND SCANNER DEVICE

(71) Applicant: BROTHER KOGYO KABUSHIKI KAISHA, Nagoya-shi, Aichi-ken (JP)

(72) Inventors: Toyoshi Adachi, Kakamigahara (JP); Takashi Suzuki, Toyota (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/668,201

(22) Filed: Mar. 25, 2015

(65) Prior Publication Data
US 2015/0281494 A1 Oct. 1, 2015

(30) Foreign Application Priority Data
Mar. 27, 2014 (JP) .................. 2014-065270

(51) Int. Cl.
*H04N 1/04* (2006.01)
*H04N 1/32* (2006.01)

(52) U.S. Cl.
CPC ................ *H04N 1/32545* (2013.01)

(58) Field of Classification Search
CPC .................................. H04N 1/32545
USPC ....................... 358/1.9, 1.13, 1.15
See application file for complete search history.

(56) References Cited

FOREIGN PATENT DOCUMENTS

| JP | 1996-223339 | * | 8/1996 | ............ H04N 1/00 |
| JP | 2002-033879 | * | 1/2002 | ............ H04N 1/00 |
| JP | 2002-033879 A | | 1/2002 | |
| JP | 2003-078692 A | | 3/2003 | |

* cited by examiner

*Primary Examiner* — Houshang Safaipour
(74) *Attorney, Agent, or Firm* — Merchant & Gould P.C.

(57) ABSTRACT

A non-transitory storage medium stores instructions executable by an information processing device including: a communication device communicable with scanners; and an input device configured to receive a signal. The instructions cause the information processing device to: transmit an inquiry about whether a reading object is ready to be scanned, to each scanner via the communication device; receive a response containing first information indicating that the reading object is on the document support, as a response to the transmitted inquiry; select at least one scanner, based on the signal input from the input device, from among at least one of the scanners which has transmitted the response containing the first information; and transmit a scan instruction via the communication device to the selected at least one scanner.

23 Claims, 23 Drawing Sheets

US 9,467,593 B2

NON-TRANSITORY STORAGE MEDIUM STORING INSTRUCTIONS EXECUTABLE BY INFORMATION PROCESSING DEVICE, INFORMATION PROCESSING DEVICE, AND SCANNER DEVICE

CROSS REFERENCE TO RELATED APPLICATION

The present application claims priority from Japanese Patent Application No. 2014-065270, which was filed on Mar. 27, 2014, the disclosure of which is herein incorporated by reference in its entirety.

BACKGROUND

1. Technical Field

The present invention relates to an information processing device capable of communicating with a plurality of scanners, a scanner device, and a non-transitory storage medium storing a plurality of instructions executable by a computer of the information processing device.

2. Description of the Related Art

There is known a scanner including a sensor provided on a document support for supporting a document to be scanned. In such a scanner, detection of the sensor allows determination of whether a document is set on the document support or not.

SUMMARY

One example of such a scanner is a scanner including an ADF (Automatic Document Feeder) and a flat bed each as the document support, and a sensor is provided for each of the ADF and the flat bed. Detection of the sensor is used to efficiently execute a scan processing. While the sensor provided on the document support can improve utility of a system for executing the scan processing as described above, further improvement in the utility of the scan system is desired. Accordingly, an object of the disclosure is to provide a scan system with higher utility.

In one aspect of the disclosure, a non-transitory storage medium stores a plurality of instructions executable by a computer of an information processing device. The information processing device includes: a communication device communicable with a plurality of scanners; and an input device configured to receive a signal which is output in response to a user operation. The plurality of instructions, when executed by the computer, cause the information processing device to execute: an inquiry processing in which an inquiry about whether a reading object is ready to be scanned is transmitted to each of the plurality of scanners via the communication device, the reading object being ready to be scanned upon detection that the reading object is placed on a document support; a response receiving processing in which a response containing first information indicating that the reading object is on the document support is received as a response to the inquiry transmitted in the inquiry processing; a selection processing in which at least one scanner is selected, based on the signal input from the input device, from among at least one of the plurality of scanners which has transmitted the response containing the first information; and an instruction transmitting processing in which a scan instruction is transmitted via the communication device to the at least one scanner selected in the selection processing.

In another aspect of the disclosure, an information processing device includes: a communication device configured to communicate with a plurality of scanners; an input device configured to receive a signal which is output in response to a user operation; and a controller configured to execute: an inquiry processing in which an inquiry about whether a reading object is ready to be scanned is transmitted to each of the plurality of scanners via the communication device, the reading object being ready to be scanned upon detection that the reading object is placed on a document support; a response receiving processing in which a response containing first information indicating that the reading object is on the document support is received as a response to the inquiry transmitted in the inquiry processing; a selection processing in which at least one scanner is selected, based on the signal input from the input device, from among at least one of the plurality of scanners which has transmitted the response containing the first information; and an instruction transmitting processing in which a scan instruction is transmitted via the communication device to the at least one scanner selected in the selection processing.

In another aspect of the disclosure, a scanner device, includes: a communication device configured to communicate with an information processing device; and a controller configured to execute: an inquiry receiving processing in which an inquiry about whether a reading object is ready to be scanned is received from the information processing device via the communication device; and a response transmitting processing in which a response to the inquiry received in the inquiry receiving processing when detecting that the reading object is placed on a document support is transmitted to the information processing device via the communication device, the response containing (i) information indicating that the reading object is ready to be scanned and (ii) information indicating a time at which the document support is placed on the reading object.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

First Embodiment

Figure 1:
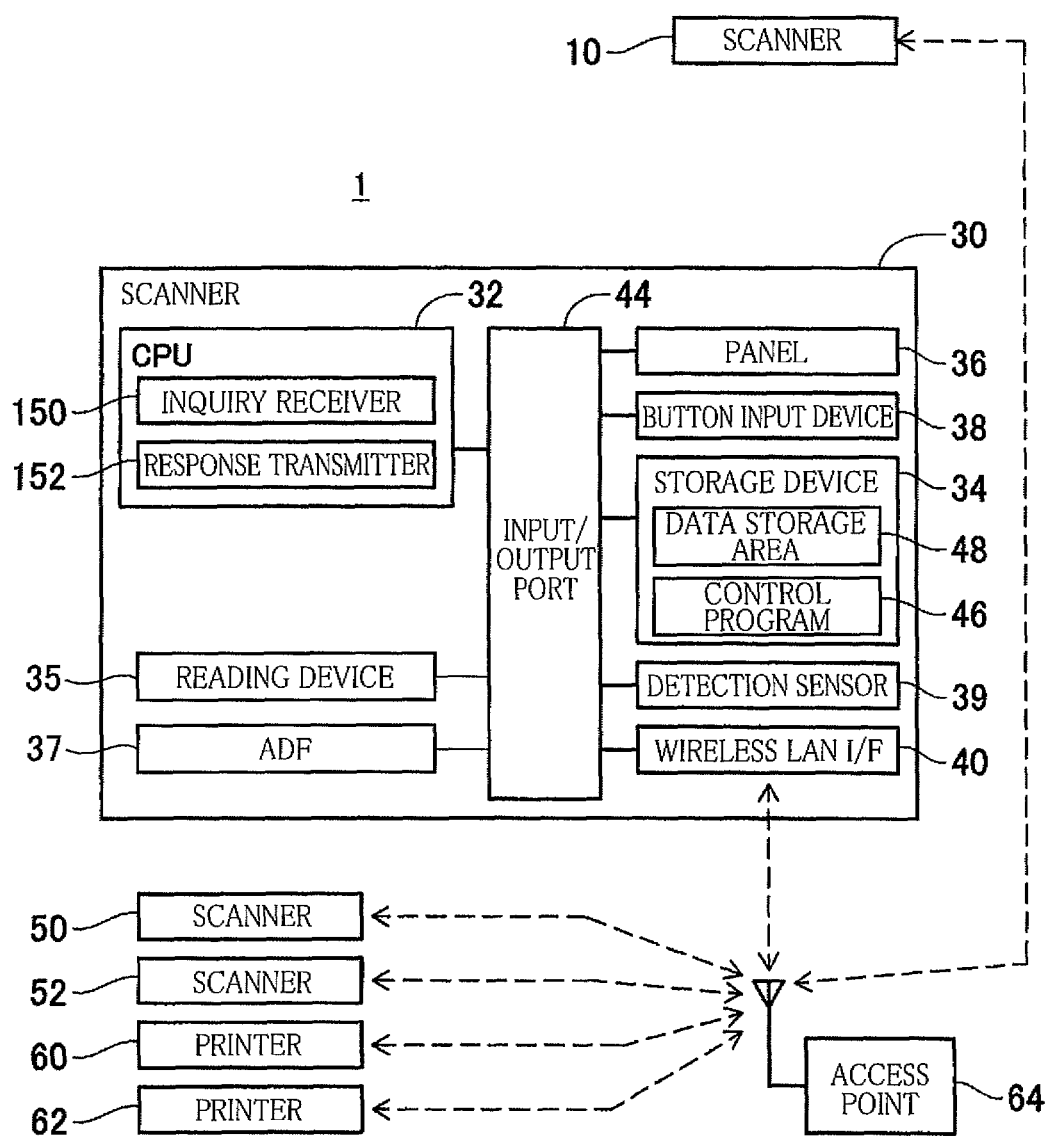
FIG. 1 is a block diagram illustrating a communication system 1 in a first embodiment.

Hereinafter, there will be described a communication system 1 in a first embodiment with reference to FIG. 1. The communication system 1 includes a scanner 10 (as one example of an information processing device and a scan-processing executing device), a scanner 30, a scanner 50, a scanner 52, a printer 60, a printer 62, and an access point 64.

Each of the scanners 10, 30, 50, 52 and the printers 60, 62 functions as a well-known wireless-LAN terminal device and is capable of transmitting and receiving data to and from each other via the access point 64. Also, each of the scanners 10, 30, 50, 52 is provided with an ADF (Automatic Document Feeder), not shown, as one example of a document support, capable of supporting a plurality of documents which are fed and scanned one by one by the scanner to create scan data for each of the documents. Each of the printers 60, 62 prints an image based on the scan data created by the scanner.

Figure 2:
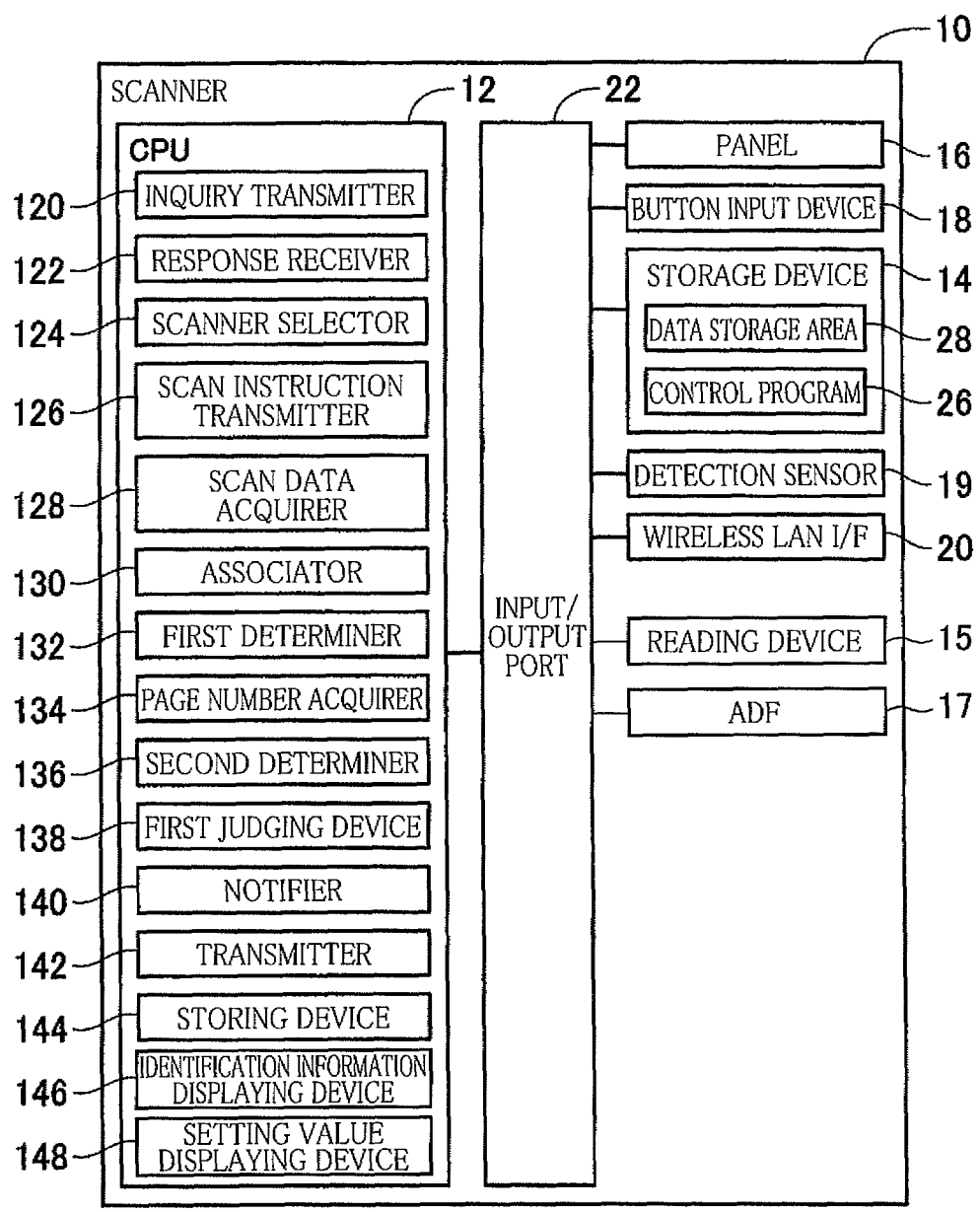
FIG. 2 is a block diagram illustrating a scanner 10.

There will be explained a structure of the scanner 10. As illustrated in FIG. 2, the scanner 10 includes: a CPU (Central Processing Unit) 12 as one example of a controller and a computer; a storage device 14; a reading device 15 configured to read an image on a document (as one example of a scan-processing executing device); a panel 16 (as one example of a display); an ADF 17; a button input device 18 (as one example of an input device); a detection sensor 19; and a wireless LAN interface 20 (as one example of a communication device). These devices can communicate with each other via an input/output port 22.

The wireless LAN interface 20 can perform wireless communication, i.e., data communication using radio waves, by utilizing a wireless LAN operating in Infrastructure mode that uses access points for data communication between a plurality of wireless-LAN terminal devices. The wireless communication is Wi-Fi (R) (the registered trademark of Wi-Fi Alliance) wireless communication according to IEEE 802.11 standard or any standard equivalent thereto. With this configuration, when the scanner 10 accesses the access point 64 and is allowed to perform the wireless communication, the scanner 10 can perform data communication with the scanners 30, 50, 52 and the printer 60 via the access point 64. It is noted that the printer 62 uses a communications protocol not supported for the scanner 10, and accordingly the scanner 10 cannot perform data communication with the printer 62 via the access point 64.

The CPU 12 executes processings according to a control program 26 (as one example of a communication program) stored in the storage device 14. The control program 26 is for causing the scanner 30 or the like to execute a scan processing and causing the CPU 12 to provide instructions for transmitting scan data created in the scan processing to, e.g., the printer 60. In the following explanation, the CPU 12 which executes a program such as the control program 26 may be described simply by the name of program. For example, wordings "the control program 26 executes" may mean wordings "the CPU 12 executing the control program 26 executes".

The storage device 14 includes a data storage area 28. The data storage area 28 is an area for storing scan data acquired from, e.g., the scanner 30 and data required for execution of the control program 26, for example. It is noted that the storage device 14 is constituted by devices including a RAM (Random Access Memory), a ROM (Read Only Memory), a flash memory, a HDD (Hard Disk), and a buffer included in the CPU 12.

The panel 16 includes a display surface for displaying various kinds of functions of the scanner 10. The button input device 18 is constituted integrally with the panel 16 to receive a button operation of a user. The detection sensor 19 detects whether a document is set (placed) on the ADF of the scanner 10 or not.

The scanners 30, 50, 52 have generally the same structure, and accordingly the following explanation will be provided for only the scanner 30 for the sake of simplicity unless otherwise required by context. As illustrated in FIG. 1, the scanner 30 includes a CPU 32 (as one example of the controller), a storage device 34, a reading device 35, a panel 36, an ADF 37, a button input device 38, a detection sensor 39, and a wireless LAN interface 40 (as one example of the communication device). These devices can communicate with each other via an input/output port 44.

Each of the CPU 32, the storage device 34, the reading device 35, the panel 36, the ADF 37, the button input device 38, the detection sensor 39, and the wireless LAN interface 40 is similar in structure to a corresponding one of the CPU 12 of the scanner 10, the storage device 14, the reading device 15, the panel 16, the ADF 17, the button input device 18, the detection sensor 19, and the wireless LAN interface 20, and an explanation of which is dispensed with. However, since the communications protocol used by the printer 62 is supported for the scanner 30, the scanner 30 can perform data communication with the printer 62 via the access point 64 unlike the scanner 10.

A control program 46 stored in the storage device 34 is for causing the CPU 32 to provide instructions for execution of the scan processing according to a scan instruction transmitted from the scanner 10. In the following explanation, the CPU 32 which executes a program such as the control program 46 may be described simply by the name of program. For example, wordings "the control program 46 executes" may mean wordings "the CPU 32 executing the control program 46 executes". The storage device 34 includes a data storage area 48 which is an area for storing scan data created by the scanner 30 and data required for execution of the control program 46, for example.

Multi-Scan Processing in Communication System 1

In the communication system 1, a plurality of documents are divided into a plurality of document groups, and the scanner 10 executes a scan processing for one of the plurality of document groups while at least one of the scanners 30, 50, 52 executes a scan processing for the other document groups. When a scan processing is executed by any of the scanners 30, 50, 52, scan data created in the scan processing is transmitted to the scanner 10. The scanner 10 combines scan data transmitted from, e.g., the scanner 30 and scan data created by the scanner 10 with each other. In this operation, a plurality of scan data (i.e., a plurality of sets of scan data) are arranged in the order of setting (placement) of the document groups each on a corresponding one of the respective ADFs of the scanners 10, 30 and so on. This is because a plurality of document groups are generally set on the ADFs of the respective scanners in the order from the first document group, and accordingly the arrangement of the scan data in the order of setting of the document groups allows the scan data to be arranged in the order that is the same as the order of arrangement of the plurality of document groups. The plurality of scan data are combined with each other in the order of the arrangement. There will be specifically explained: the scan processing in each of the scanners 10, 30 and so on; the processing for arranging the plurality of scan data created by the scan processing in the scanners 10, 30 and so on; and the combining processing.

Figure 3:
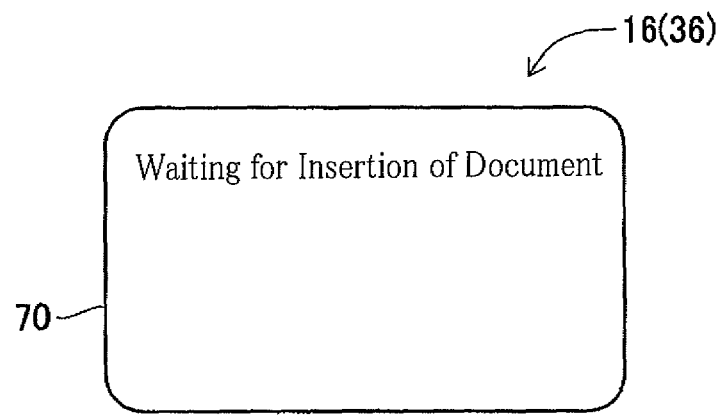
FIG. 3 is a view illustrating an insertion waiting screen 70 displayed on a panel 16 of the scanner 10 and a panel 36 of each of scanners 30, 50, 52.

First, as illustrated in FIG. 3, an insertion waiting screen 70 is displayed on the panel 16 of the scanner 10 and the panel 36 of each of the scanners 30, 50, 52. The insertion waiting screen 70 indicates that no document is set on the ADF of each of the scanners 10, 30, 50, 52, and this insertion waiting screen 70 is displayed while a corresponding one of the scanners 10, 30, 50, 52 is waiting for documents to be set on the ADF.

Figure 4:
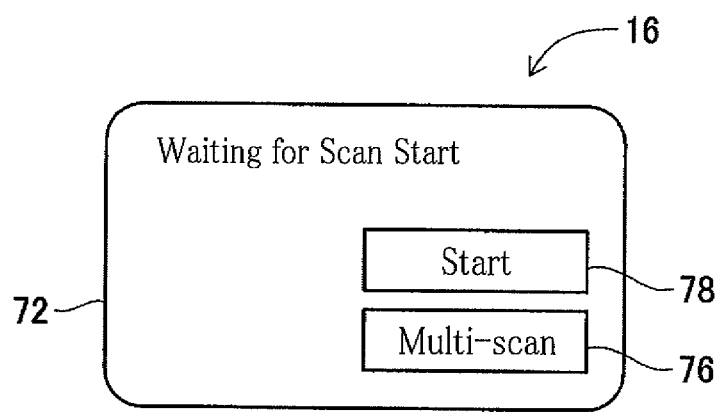
FIG. 4 is a view illustrating a start screen 72 displayed on the panel 16 of the scanner 10.

When the documents are set on the ADF of the scanner 10, as illustrated in FIG. 4, a start screen 72 is displayed on the panel 16 of the scanner 10. It is noted that the detection sensor 19 detects the presence or absence of the documents set on the ADF of the scanner 10. A multi-scan button 76 and a start button 78 are displayed on the start screen 72. The multi-scan button 76 is for executing a multi-scan processing in which the scan processing is executed by the other scanners 30, 50, 52 and the scanner 10, and the scan data created by the other scanners 30, 50, 52 and the scan data created by the scanner 10 are combined with each other. The start button 78 is a button for causing only the scanner 10 to execute the scan processing (hereinafter may be referred to as "individual scan processing"), that is, the start button 78 is a button for a normal scan processing to be executed by a single scanner. It is noted that when the documents are set on the ADF of the scanner 10, a time (i.e., a time of day) at which the documents are set is stored into the data storage area 28.

Figure 5:
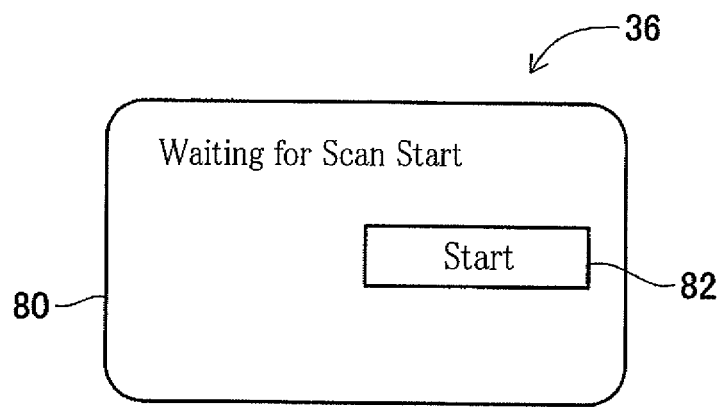
FIG. 5 is a view illustrating a start screen 80 displayed on the panel 36 of each of the scanners 30, 50, 52.

When the documents are set on the respective ADFs of the scanners 30, 50, 52, as illustrated in FIG. 5, a start screen 80 is displayed on the panel 16 of the scanner 10 and the panel 36 of each of the scanners 30, 50, 52 on which the documents are set. It is noted that the detection sensors 39 detect the presence or absence of the documents set on the respective ADFs of the scanners 30, 50, 52. A start button 82 is displayed on the start screen 80. The start button 82 is a button for execution of the scan processing by only one of the scanners 30, 50, 52 on which the start button 82 is displayed. It is noted that when the documents are set on each of the respective ADFs of the scanners 50, 52, a time of setting of the documents on each ADF is stored into the data storage area 48. Since the scanner 30 does not have a clock function, a counter starts operating at the point in time when the documents are set. That is, the scanner 30 has a time measurement function and starts time measurement at the point in time when the documents are set.

When the start button 78 is operated on the start screen 72 displayed on the scanner 10, the individual scan processing is executed by the scanner 10. Also, when the start button 82 is operated on the start screen 80 displayed on any one of the scanners 30, 50, 52, the individual scan processing is executed by the one scanner on which the operated start button 82 is displayed. This individual scan processing is a normal scan processing to be executed by a single scanner as described above, and an explanation of which is dispensed with. When the multi-scan button 76 is operated on the start screen 72 displayed on the scanner 10, a multi-scan processing is executed.

In the multi-scan processing, the scanner 10 sends the other scanners 30, 50, 52, an inquiry about document insertion information and scan profile information. The document insertion information contains the presence or absence of the documents set on the ADF and a time elapsed from the setting of the documents in the case where the documents are being set on the ADF (noted that this time hereinafter may be referred to as "after-setting elapsed time"). The scan profile information contains: a scanning ability of each scanner such as a resolution, a file format, the presence or absence of a color scanning function, the presence or absence of a duplex scanning function; and communication information about a device to which scan data can be transmitted from each scanner. It is noted that the communication information is used as a destination address of the device when communication is performed with the device, and examples of the communication information include an IP address, a network folder, an e-mail address, and a URL.

Figure 6:
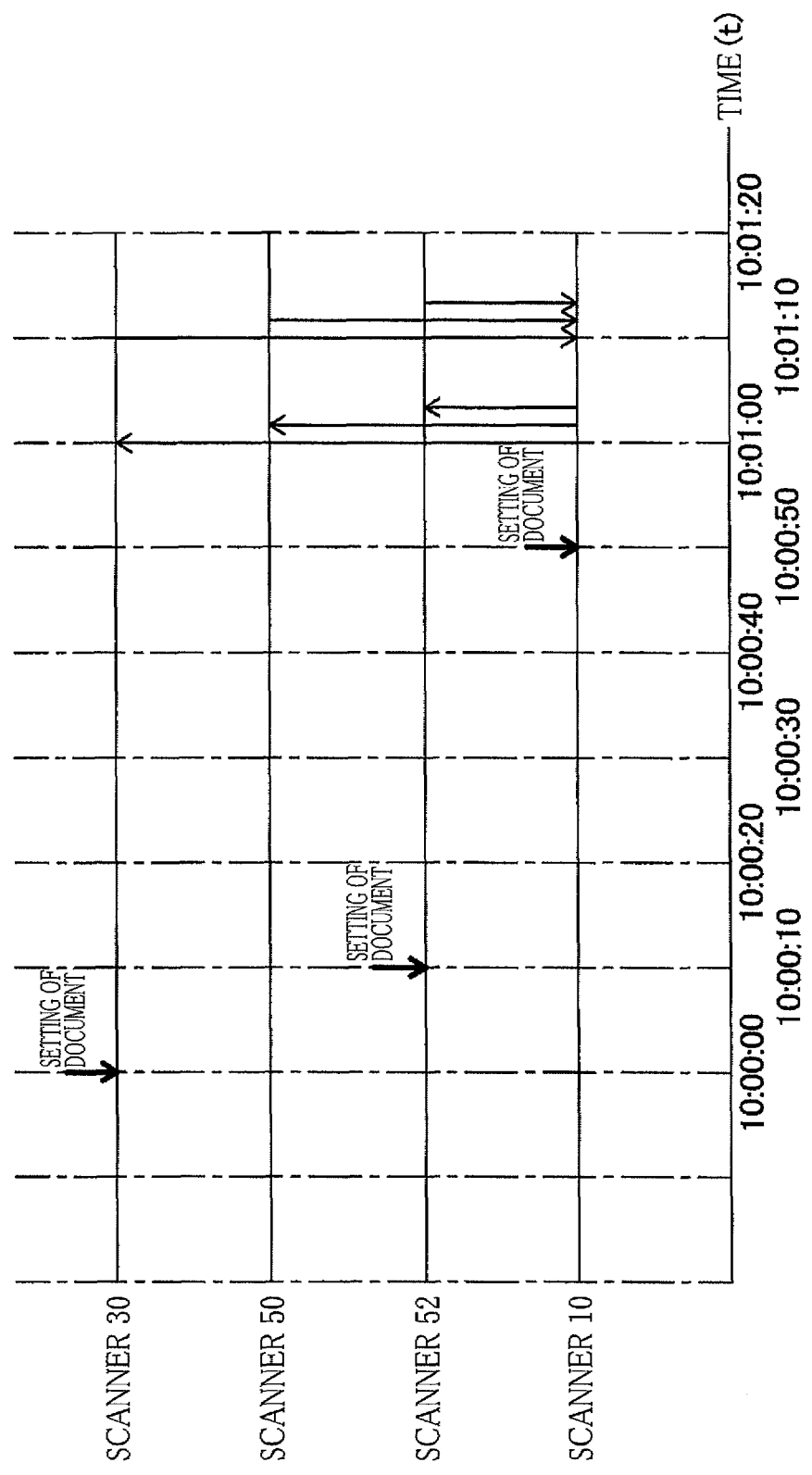
FIG. 6 is a view illustrating a relationship between a time at which documents are set on the scanners 10, 30, 50, 52 and an after-setting elapsed time.

Upon receiving the inquiry about the document insertion information and the scan profile information from the scanner 10, each of the scanners 30, 50, 52 sends the scanner 10 a response to the inquiry. Specifically, it is assumed, as illustrated in FIG. 6, that documents are set on the ADF of the scanner 30 at 10 o'clock, documents are set on the ADF of the scanner 52 at 10:00:10, and the inquiry is transmitted from the scanner 10 to the scanners 30, 50, 52 at 10:01:00.

In this case, the scanner 30 stops the counter at the point in time when the inquiry is received. That is, the time measurement started at the point in time when the documents are set is stopped at the point in time when the inquiry is received. As a result, the after-setting elapsed time for the scanner 30 is 60 seconds.

The scanner 30 transmits information indicating that the documents are being set on the ADF (hereinafter may be referred to as "set information") and the after-setting elapsed time as the document insertion information to the scanner 10 at 10:01:10. It is noted that the determination of the time of setting of documents and transmission and reception of data are performed each 10 seconds because a period of control of each of the scanners 10, 30, 50, 52 is 10 seconds.

In the scanner 52, the after-setting elapsed time is calculated based on the time of reception of the inquiry and the time stored in the data storage area 48, i.e., the time at which the documents are set on the ADF. As a result, the after-setting elapsed time for the scanner 52 is 50 seconds. The scanner 52 transmits the set information and the after-setting elapsed time as the document insertion information to the scanner 10 at 10:01:10. It is noted that since no documents are set on the ADF of the scanner 50, the scanner 50 transmits information indicating that no documents are set on the ADF, as the document insertion information to the scanner 10 at 10:01:10.

Documents are set on the ADF of the scanner 10 at 10:00:50. Thus, the after-setting elapsed time is calculated based on the time of transmission of the inquiry and the time at which the documents are set on the ADF of the scanner 10. As a result, the after-setting elapsed time for the scanner 10 is 10 seconds.

Figure 7:
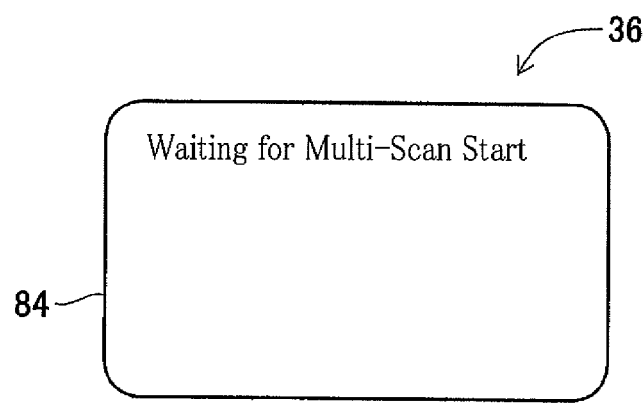
FIG. 7 is a view illustrating a scan waiting screen 84 displayed on the panel 36 of each of the scanners 30, 50, 52.

It is noted that the scanners 30, 50, 52 transmit not only the document insertion information but also the scan profile information to the scanner 10. As illustrated in FIG. 7, each of the scanners 30, 50, 52 displays a scan waiting screen 84 on the panel 36. The scan waiting screen 84 indicates that the scanner waits for instruction of the multi-scan processing.

Upon receiving the response to the inquiry from each of the scanners 30, 50, 52, the scanner 10 based on the response identifies the order of setting of document groups on the scanners on which the documents are set. Specifically, the after-setting elapsed times for the respective scanners having transmitted the set information, namely, the scanner 30 and the scanner 52, and the after-setting elapsed time for the scanner 10 are sorted and arranged in descending order of time, and the order of arrangement is identified as the order of setting of the document groups. That is, in the situation illustrated in FIG. 6, the order of setting of the document groups is identified as the order of the scanner 30, the scanner 52, and the scanner 10. It is noted that in the case where there is no scanner having transmitted the set information, that is, in the case where the information indicating that no documents are set on the ADF is received from each of the scanners 30, 50, 52, the multi-scan processing cannot be executed, and the scanner 10 executes the individual scan processing.

Figure 8:
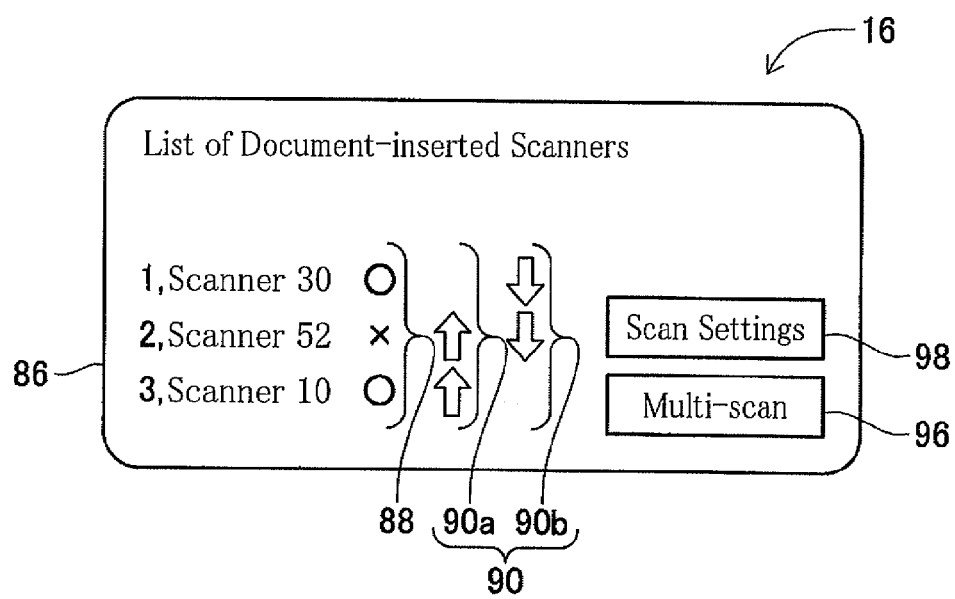
FIG. 8 is a view illustrating a scanner list screen 86 displayed on the panel 16 of the scanner 10.

Thereafter, when the order of setting of the document groups is identified, as illustrated in FIG. 8, the scanner 10 controls the panel 16 to display a screen 86 (hereinafter may be referred to as "scanner list screen") for displaying a list of the scanners 10, 30, 52 on which the documents are set. On the scanner list screen 86, the scanners 10, 30, 52 on which the documents are set are displayed so as to be arranged in the order of identification, i.e., the order of setting of the document groups from an upper side.

The scanner list screen 86 contains a necessity button 88 and order change buttons 90 for each of the scanners 10, 30, 52. The necessity button 88 is a button for selecting requirement of the multi-scan processing of a corresponding one of the scanners 10, 30, 52. Operation of the necessity button 88 switches a display between a mark "○" and a mark "x". In the case where the necessity button 88 is the mark "○", the multi-scan processing is executed for the scanners including the scanner corresponding to the necessity button 88. In the case where the necessity button 88 is the mark "x", on the other hand, the multi-scan processing is not executed for the scanner corresponding to the necessity button 88.

Specifically, for example, there is a case where, when a user has set documents on the ADFs of the scanner 10 and the scanner 30 for the multi-scan processing using the two scanners 10, 30, another user sets documents on the ADF of the scanner 52 for the scan processing using the scanner 52. In this case, the user having a plan of the multi-scan processing requires scan data to be obtained by the two scanners 10, 30 but does not require scan data to be obtained by the scanner 52. Thus, the user having a plan of the multi-scan processing operates the necessity buttons 88 such that each of the necessity buttons 88 respectively corresponding to the scanner 10 and the scanner 30 becomes the mark "○", and the necessity button 88 corresponding to the scanner 52 becomes the mark "x".

Each of the order change buttons 90 is a button for changing the ordinal number of a corresponding one of the scanners 10, 30, 52 displayed on the scanner list screen 86. The order change buttons 90 include an order change button 90a as an up arrow and an order change button 90b as a down arrow. The order change button 90a as the up arrow is a button for decreasing the ordinal number of the corresponding scanner by one (that is, scan data obtained by the scanner for which the order change button 90a is pressed is to appear earlier among the combined scan data), and the order change button 90b as the down arrow is a button for increasing the ordinal number of the corresponding scanner by one (that is, scan data obtained by the scanner for which the order change button 90b is pressed is to appear later among the combined scan data). Specifically, for example, as illustrated in FIG. 8, when the order change button 90a as the up arrow corresponding to the scanner 10 is operated in the state in which the scanners are displayed in the order of the scanner 30, the scanner 52, and the scanner 10, the scanner 10 and the scanner 52 are replaced with each other, and the scanners are displayed in the order of the scanner 30, the scanner 10, and the scanner 52. When the order change button 90b as the down arrow corresponding to the scanner 30 is operated, the scanner 30 and the scanner 52 are replaced with each other, and the scanners are displayed in the order of the scanner 52, the scanner 30, and the scanner 10.

The scanner list screen 86 further contains a multi-scan button 96 and a scan setting button 98. The multi-scan button 96 is a button for starting the multi-scan processing based on settings displayed on the scanner list screen 86. That is, in the case where the multi-scan button 96 is operated on the scanner list screen 86 illustrated in FIG. 8, for example, the multi-scan processing is executed by the scanner 10 and the scanner 30, and scan data is arranged in the order of the scanner 30 and the scanner 10.

Figure 9:
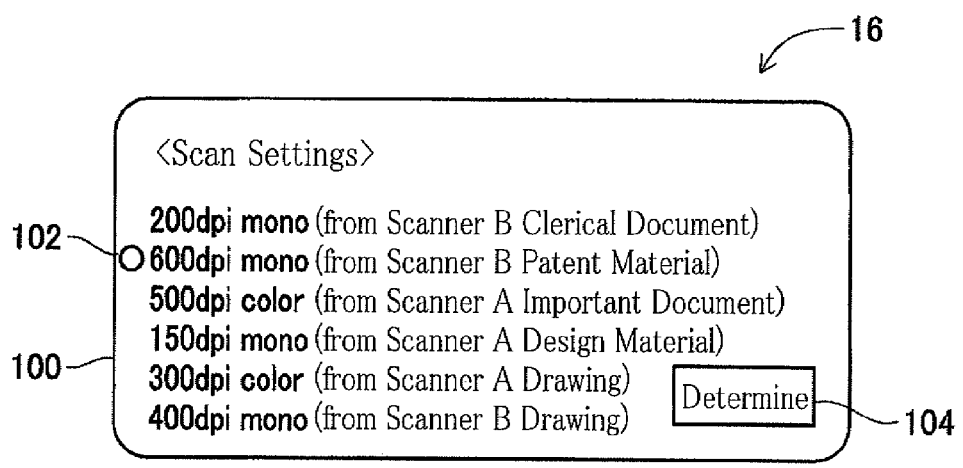
FIG. 9 is a view illustrating a scan setting screen 100 displayed on the panel 16 of the scanner 10.

The scan setting button 98 is a button for changing scan settings of the multi-scan processing. When the scan setting button 98 is operated, as illustrated in FIG. 9, a scan setting screen 100 is displayed on the panel 16 of the scanner 10. Common scanning abilities among the scanning abilities of a plurality of scanners for executing the multi-scan processing are displayed on the scan setting screen 100.

Specifically, for example, since the scanner 10 and the scanner 30 are selected as the scanners for executing the multi-scan processing on the scanner list screen 86 illustrated in FIG. 8, the resolution, the presence or absence of the color scanning, and the presence or absence of the duplex scanning in the scanner 30 are extracted from the scan profile information acquired from the scanner 30. The resolution, the presence or absence of the color scanning, and the presence or absence of the duplex scanning in the scanner 10 are stored in the data storage area 28. The resolution, the presence or absence of the color scanning, and the presence or absence of the duplex scanning in the scanner 30 are respectively compared with the resolution, the presence or absence of the color scanning, and the presence or absence of the duplex scanning in the scanner 10, and common scanning abilities among the scanning abilities of the two scanners 10, 30 are displayed on the scan setting screen 100.

That is, in the case where the highest resolution of the scanner 10 is 700 dpi, and the highest resolution of the scanner 30 is 600 dpi, for example, the resolution of 600 dpi at the highest is displayed on the scan setting screen 100. In the case where the resolution is 600 dpi, the scanner 10 can perform color scanning, but the scanner 30 cannot perform color scanning. Thus, monochrome scanning is displayed as the color setting on the scan setting screen 100 in this case. Also, the scanner 10 can perform duplex scanning, but the scanner 30 cannot perform duplex scanning. Thus, the setting of the duplex scanning is not displayed on the scan setting screen 100.

As thus described, only the common scanning abilities among the scanning abilities of the plurality of scanners set for executing the multi-scan processing are displayed on the scan setting screen 100, allowing the scan processing to be executed in the same settings by the plurality of scanners set for executing the multi-scan processing, making it possible to combine scan data having the same settings such as the same resolution and the same color setting.

A "○" mark 102 is displayed in front of one of the scan settings displayed on the scan setting screen 100. This ○ mark 102 indicates a selected one of the scan settings. That is, monochrome scanning at the resolution of 600 dpi is set on the scan setting screen 100 illustrated in FIG. 9. The ○ mark 102 is moved to another setting by a user operation. In parentheses for each setting, a name of scanner using the setting and a name given to the setting in the scanner are described. This configuration allows the user to select one of the settings with a familiar name. A set of preset setting values may be displayed on the scan setting screen 100 for a plurality of setting items of one of the scanners 10, 30, 50. A processing for displaying a set of the setting values on the scan setting screen 100 is one example of a setting-value-set displaying processing.

Figure 10:
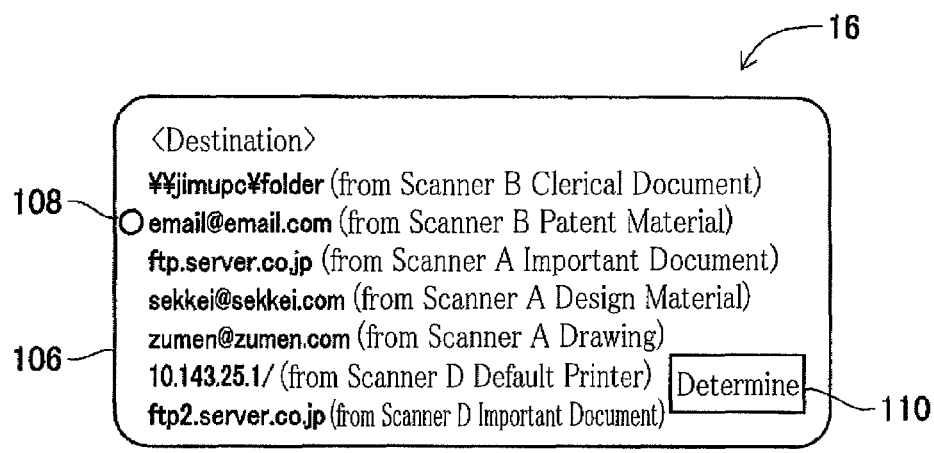
FIG. 10 is a view illustrating a transmission destination setting screen 106 displayed on the panel 16 of the scanner 10.

A determination button 104 is displayed on the scan setting screen 100. The determination button 104 is a button for determining the scan setting of the multi-scan processing to the scan setting set on the scan setting screen 100, i.e., the scan setting corresponding to the ○ mark 102. When the determination button 104 is operated, a transmission destination setting screen 106 is displayed on the panel 16 of the scanner 10 as illustrated in FIG. 10.

The transmission destination setting screen 106 is a screen for setting a device as a destination of transmission of scan data obtained by combining a plurality of scan data (hereinafter may be referred to as "combined scan data"). The transmission destination setting screen 106 contains a plurality of sets of communication information such as addresses of devices such as a server, a printer, a PC, and a mobile terminal to which the combined scan data can be transmitted. The plurality of sets of the communication information displayed on the transmission destination setting screen 106 are sets of communication information of all devices to which the combined scan data can be transmitted from each of the scanner 10 and the scanners 30, 50, 52 having transmitted the scan profile information. That is, communication information about the scanner 10 and communication information contained in the scan profile information acquired from the scanners 30, 50, 52 are displayed on the transmission destination setting screen 106.

A "○" mark 108 is displayed in front of one set of the communication information displayed on the transmission destination setting screen 106. This ○ mark 108 indicates a selected one set of the communication information. That is, on the transmission destination setting screen 106 illustrated in FIG. 10, a device assigned with email@email.com as the communication information is set as the destination of transmission of the combined scan data. It is noted that the ○ mark 108 is moved to another set of communication information by a user operation. In parentheses for each setting, a name of scanner using the communication information and a name given to the communication information in the scanner are described. This configuration allows the user to select one set of the communication information with a familiar name.

A determination button 110 is displayed on the transmission destination setting screen 106. The determination button 110 is a button for determining the device to which the combined scan data is to be transmitted, to the transmission destination information set on the transmission destination setting screen 106, i.e., the device of the transmission destination information corresponding to the ○ mark 108. When the determination button 110 is operated, the scanner list screen 86 is displayed on the panel 16 of the scanner 10 as illustrated in FIG. 8. When the multi-scan button 96 is operated on the scanner list screen 86, the scan instruction is transmitted to a scanner having been set to execute the multi-scan processing, i.e., the scanner 30 for which the mark "○" is displayed as the necessity button 88 on the scanner list screen 86 in FIG. 8. Upon receiving the scan instruction, the scanner 30 starts the scan processing. It is noted that the mark "○" is displayed as the necessity button 88 on the scanner list screen 86 also for the scanner 10, but since the device having transmitted the scan instruction is the scanner 10, the scanner 10 starts the scan processing in response to the operation on the multi-scan button 96.

Figure 11:
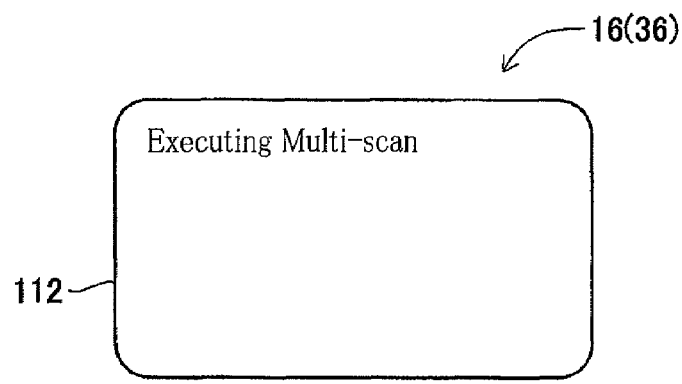
FIG. 11 is a view illustrating a processing executing screen 112 displayed on the panel 16 of the scanner 10 and the panel 36 of each of the scanners 30, 50, 52.

When the scan processing is started by the scanner 10 and the scanner 30, a processing executing screen 112 as illustrated in FIG. 11 is displayed on the panel 16 of the scanner 10 and the panel 36 of the scanner 30. The processing executing screen 112 indicates that the scan processing is being executed by the scanner which is displaying this screen.

Upon completion of the scan processing in the scanner 30, scan data created in the scan processing is transmitted to the scanner 10. Upon completion of the scan processing in the scanner 10, the scanner 10 analyzes scan data created in the scan processing by the scanner 10 (hereinafter may be referred to as "self-created scan data") and the scan data received from the scanner 30 (hereinafter may be referred to as "acquired scan data").

Specifically, OCR (Optical Character Recognition) is performed in the analysis of the scan data to extract, from the scan data, information about page numbers respectively assigned to the documents based on which the scan data are created. The order of arrangement of the self-created scan data and the acquired scan data is determined based on the information about the page numbers. This determined order of arrangement (hereinafter may be referred to as "page-number arrangement order") is compared with the order of arrangement of scanners which is set on the scanner list screen 86 illustrated in FIG. 8 (hereinafter may be referred to as "set arrangement order"). When the page-number arrangement order is the same as the set arrangement order, it is determined that the set arrangement order is the right order. When the page-number arrangement order and the set arrangement order differ from each other, it is determined that the set arrangement order is not the right order. That is, in the case where the page numbers 1-10 are extracted from the self-created scan data, and the page numbers 11-20 are extracted from the acquired scan data as a result of the analysis of the scan data, and when the set arrangement order is the order of the scanner 10 and then the scanner 30, it is determined that the set arrangement order is the right order, and when the set arrangement order is the order of the scanner 30 and the scanner 10, it is determined that the set arrangement order is not the right order. This configuration can check the set arrangement order.

When it is determined that the set arrangement order is the right order, the self-created scan data and the acquired scan data are arranged in the set arrangement order, and the self-created scan data and the acquired scan data are combined with each other in this order. The combined scan data is transmitted to a device as the destination of transmission based on the communication information that is set on the transmission destination setting screen 106 illustrated in FIG. 10. In some cases, however, the scanner 10 cannot transmit the combined scan data to the device as the destination of transmission based on the communication information set on the transmission destination setting screen 106.

Specifically, as described above, the printer 62 uses the communications protocol not supported for the scanner 10, and data communication cannot be performed between the scanner 10 and the printer 62. Thus, in the case where the printer 62 is set as the device as the destination of transmission, for example, the scanner 10 cannot transmit the combined scan data to the printer 62. Since the communications protocol used by the printer 62 is supported for the scanner 30, unlike the scanner 10, the scanner 30 can perform data communication with the printer 62.

For this reason, in the communication system 1, in the case where the printer 62 is set as the device to which the combined scan data is to be transmitted, the scanner 10 transmits the combined scan data to the scanner 30 which then transmits the combined scan data to the printer 62. It is noted that in the case where the scanner 10 can transmit the combined scan data to the device as the destination of transmission based on the communication information set on the transmission destination setting screen 106, the scanner 10 transmits the combined scan data. Specifically, the scanner 10 can perform data communication with the printer 60 as described above. Thus, in the case where the printer 60 is set as the device to which the combined scan data is to be transmitted, the scanner 10 transmits the combined scan data to the printer 60.

It is noted that when it is determined that the set arrangement order is not the right order, a plurality of scan data not combined are transmitted to the device as the destination of transmission based on the communication information set on the transmission destination setting screen 106, in a method that is the same as the above-described method.

In the communication system 1 as described above, the documents are set on the plurality of scanners, then the scan processing is executed by each of the plurality of scanners, and the plurality of scan data created in the scan processing are combined with each other. This configuration improves operability of the scan system. Also, when the plurality of scan data are combined with each other, the plurality of scan data are arranged in the order of setting of the documents onto the scanner by utilizing a general user operation of setting the plurality of document groups on the respective ADFs of the plurality of scanners in order from the first document group. This configuration can eliminate the need to input the order of arrangement of the plurality of scan data, resulting in reduction in the number of operations of the user.

In the communication system 1, the plurality of scanners set for executing the multi-scan processing are displayed on the scanner list screen 86 in the order in which the document groups are set. With this configuration, the user can recognize the order of document groups set by the user, on the scanner list screen 86. Also, the user can change the order of arrangement of the scanners displayed on the scanner list screen 86. With this configuration, the user can correct a mistake made during setting of the documents on the ADFs.

In the communication system 1, the information about the page numbers of the documents are extracted from the scan data, and the set arrangement order is checked based on the information about the page numbers. With this configuration, the plurality of scan data can be combined with each other in the right order of arrangement.

Control Program

The above-described multi-scan processing is executed by (i) execution of the control program 26 by the CPU 12 of the scanner 10 and (ii) execution of the control program 46 by the CPU 32 of each of the scanners 30, 50, 52. There will be explained, with reference to FIGS. 12 and 13, a flow when the control program 46 is executed by the CPU 32 of each of the scanners 30, 50, 52, and there will be explained, with reference to FIGS. 14-19, a flow when the control program 26 is executed by the CPU 12 of the scanner 10.

Figure 12:
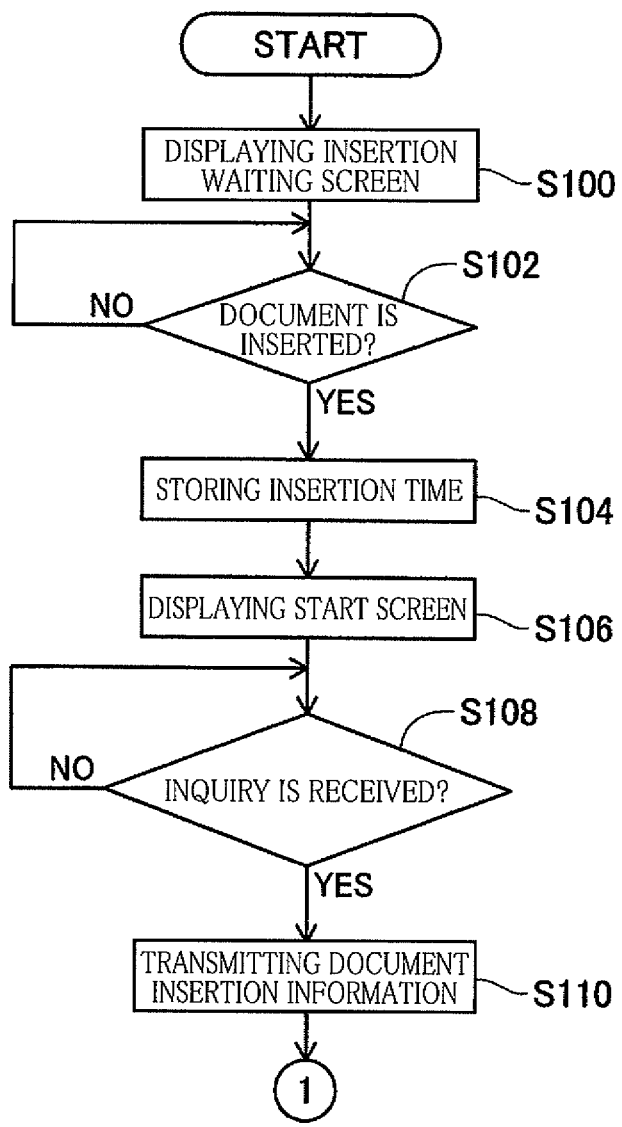
FIG. 12 is a flow chart illustrating processings executed by the scanners 30, 50, 52.
Figure 13:
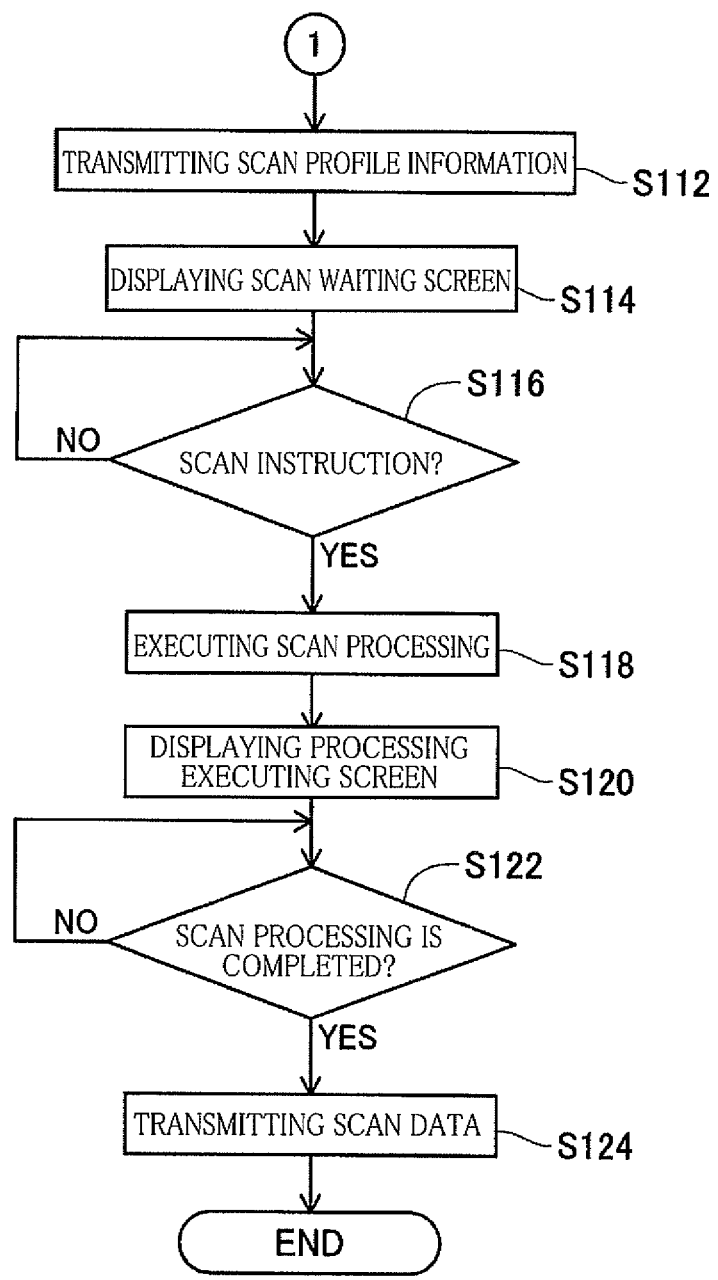
FIG. 13 is a flow chart illustrating processings executed by the scanners 30, 50, 52.

When the control program 46 is executed, the flow illustrated in FIG. 12 begins with S100 at which the insertion waiting screen 70 is displayed on the panel 36 of each of the scanners 30, 50, 52. The CPU 32 at S102 determines whether the documents are set on the respective ADFs of the scanners 30, 50, 52 or not. When the documents are not set on the respective ADFs of the scanners 30, 50, 52 (S102: NO), the processing at S102 is repeated. When the documents are set on the respective ADFs of the scanners 30, 50, 52 (S102: YES), the time of insertion of the documents are stored at S104. The scanner 30 starts time measurement at the point in time when the documents are set.

At S106, the start screen 80 is displayed on the panel 36 of each of the scanners 30, 50, 52. The CPU 32 at S108 determines whether the inquiry has been received from the scanner 10 or not. When the inquiry is not received from the scanner 10 (S108: NO), the processing at S108 is repeated. When the inquiry is received from the scanner 10 (S108: YES), the document insertion information is transmitted to the scanner 10 at S110. The scan profile information is also transmitted to the scanner 10 at S112.

At S114, the scan waiting screen 84 is displayed on the panel 36 of each of the scanners 30, 50, 52. The CPU 32 at S116 determines whether a scan instruction has been received from the scanner 10 or not. When the scan instruction is not received from the scanner 10 (S116: NO), the processing at S116 is repeated. When the scan instruction is received from the scanner 10 (S116: YES), the CPU 32 at 118 executes the scan processing.

At S120, the processing executing screen 112 is displayed on the panel 36 of each of the scanners 30, 50, 52. The CPU 32 at S122 determines whether the scan processing is completed or not. When the scan processing is not completed (S122: NO), the processing at S122 is repeated. When the scan processing is completed (S122: YES), the scan data created in the scan processing is transmitted to the scanner 10 at S124. As a result, the processings of the control program 46 are finished.

Figure 14:
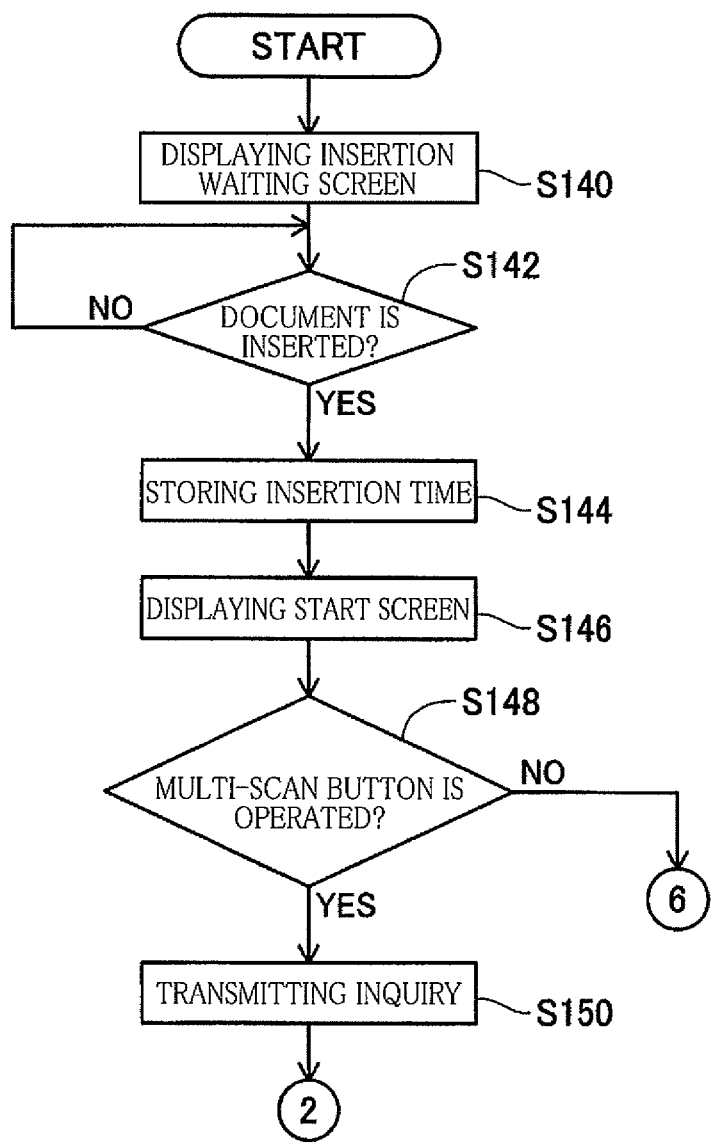
FIG. 14 is a flow chart illustrating processings executed by the scanner 10.
Figure 15:
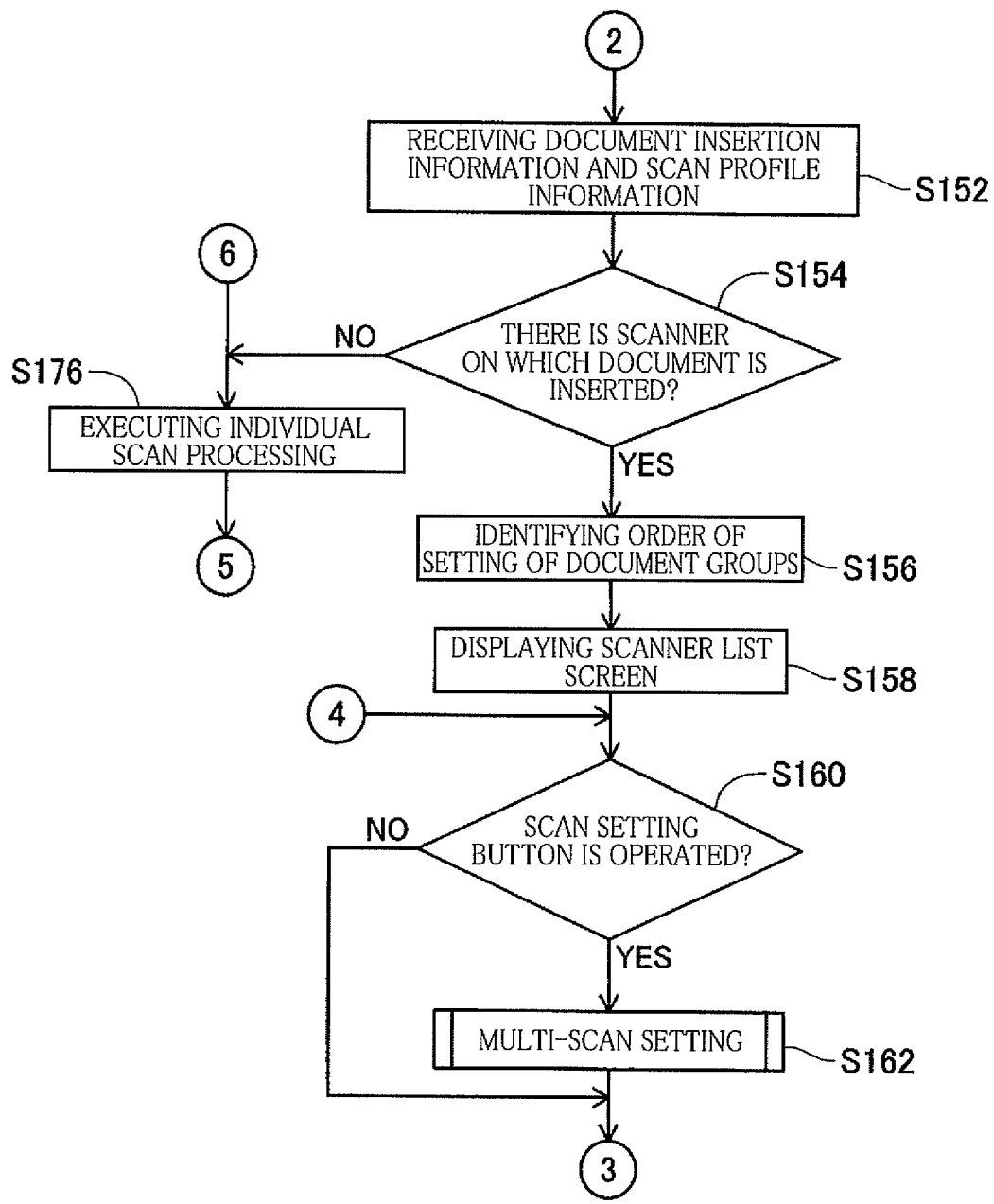
FIG. 15 is a flow chart illustrating processings executed by the scanner 10.

When the control program 26 is executed, the flow illustrated in FIG. 14 begins with S140 at which the insertion waiting screen 70 is displayed on the panel 16 of the scanner 10. The CPU 12 at S142 determines whether the documents are set on the ADF of the scanner 10 or not. When the documents are not set on the ADF of the scanner 10 (S142: NO), the processing at S142 is repeated. When the documents are set on the ADF of the scanner 10 (S142: YES), the time of insertion of the documents is stored at S144.

At S146, the start screen 72 is displayed on the panel 16 of the scanner 10. The CPU 12 at S148 determines whether the multi-scan button 76 displayed on the start screen 72 has been operated or not. When the multi-scan button 76 is operated (S148: YES), the CPU 12 at S150 transmits the inquiry about the document insertion information and the scan profile information to the scanners 30, 50, 52. The CPU 12 at S152 receives the document insertion information and the scan profile information, as a response to the inquiry, from the scanners 30, 50, 52.

The CPU 12 at S154 determines whether there is a scanner on which the documents are set among the scanners 30, 50, 52 or not based on the document insertion information. That is, the CPU 12 determines whether the received document insertion information contains the set information or not. When there is a scanner on which the documents are set among the scanners 30, 50, 52 (S154: YES), the CPU 12 at S156 identifies the order of setting of the document groups based on the after-setting elapsed time contained in the document insertion information and the after-setting elapsed time for the scanner 10.

At S158, the scanner list screen 86 is displayed on the panel 16 of the scanner 10. When the scanner list screen 86 is displayed, the CPU 12 at S160 determines whether the scan setting button 98 displayed on the scanner list screen 86 has been operated or not. When the scan setting button 98 is operated (S160: YES), the CPU 12 executes a multi-scan setting sub-routine at S162.

Figure 17:
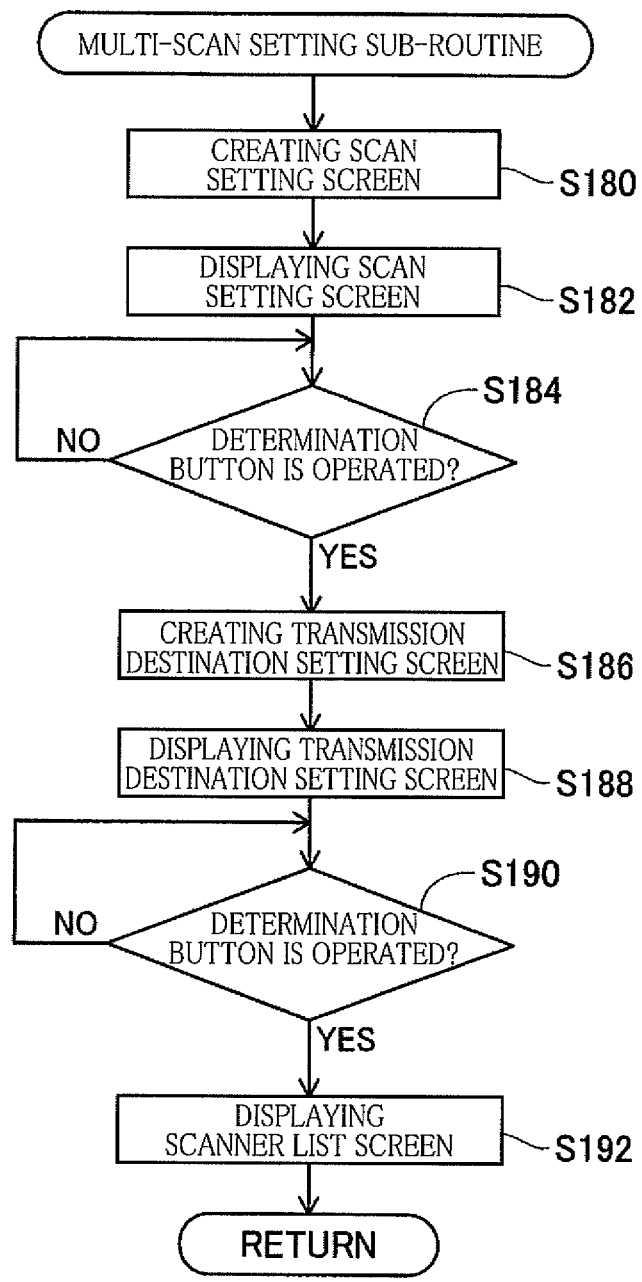
FIG. 17 is a flow chart illustrating processings executed by the scanner 10.

The multi-scan setting sub-routine illustrated in FIG. 17 begins with S180 at which the CPU 12 creates the scan setting screen 100. Specifically, as described above, the CPU 12 extracts all the common scanning abilities among the scanning abilities of a plurality of scanners which are to execute the multi-scan processing (hereinafter may be referred to as "multi-scan scanners") and creates the scan setting screen 100 based on the common scanning abilities. At S182, the scan setting screen 100 is displayed on the panel 16 of the scanner 10.

At S184, the CPU 12 determines whether the determination button 104 displayed on the scan setting screen 100 has been operated or not. When the determination button 104 is not operated (S184: NO), the processing at S184 is repeated. When the determination button 104 is operated (S184: YES), the CPU 12 at S186 creates the transmission destination setting screen 106. Specifically, the CPU 12 extracts communication information set for each of the scanners 10, 30, 50, 52 and creates the transmission destination setting screen 106 based on all the sets of the extracted communication information.

At S188, the transmission destination setting screen 106 is displayed on the panel 16 of the scanner 10. The CPU 12 at S190 determines whether the determination button 110 displayed on the transmission destination setting screen 106 has been operated or not. When the determination button 110 is not operated (S190: NO), the processing at S190 is repeated. When the determination button 110 is operated (S190: YES), the scanner list screen 86 is displayed on the panel 16 of the scanner 10 at S192, and the processings of the multi-scan setting sub-routine are finished.

Figure 16:
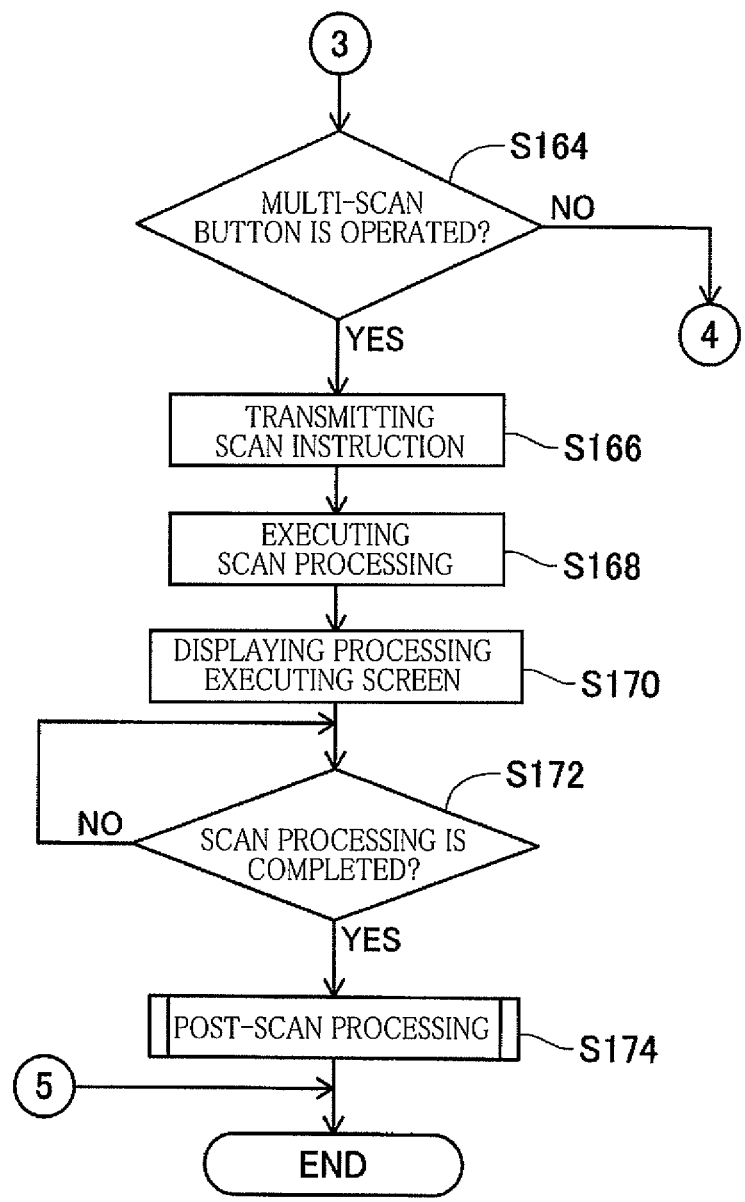
FIG. 16 is a flow chart illustrating processings executed by the scanner 10.

When the processings of the multi-scan setting sub-routine are finished, the flow goes to S164 in the main routine. It is noted that also when the scan setting button 98 is not operated at S160 (S160: NO), the flow goes to S164. As illustrated in FIG. 16, the CPU 12 at S164 determines whether the multi-scan button 96 displayed on the scanner list screen 86 has been operated or not. When the multi-scan button 96 is not operated (S164: NO), this flow returns to S160. When the multi-scan button 96 is operated (S164: YES), the CPU 12 at S166 transmits the scan instruction to the multi-scan scanners.

When the scan instruction is transmitted, the scanner 10 executes the scan processing at S168. At S170, the processing executing screen 112 is displayed on the panel 16 of the scanner 10. The CPU 12 at S172 determines whether the scan processing is completed in the scanner 10 or not. When the scan processing is not completed (S172: NO), the processing at S172 is repeated. When the scan processing is completed (S172: YES), a post-scan processing sub-routine is executed at S174.

Figure 18:
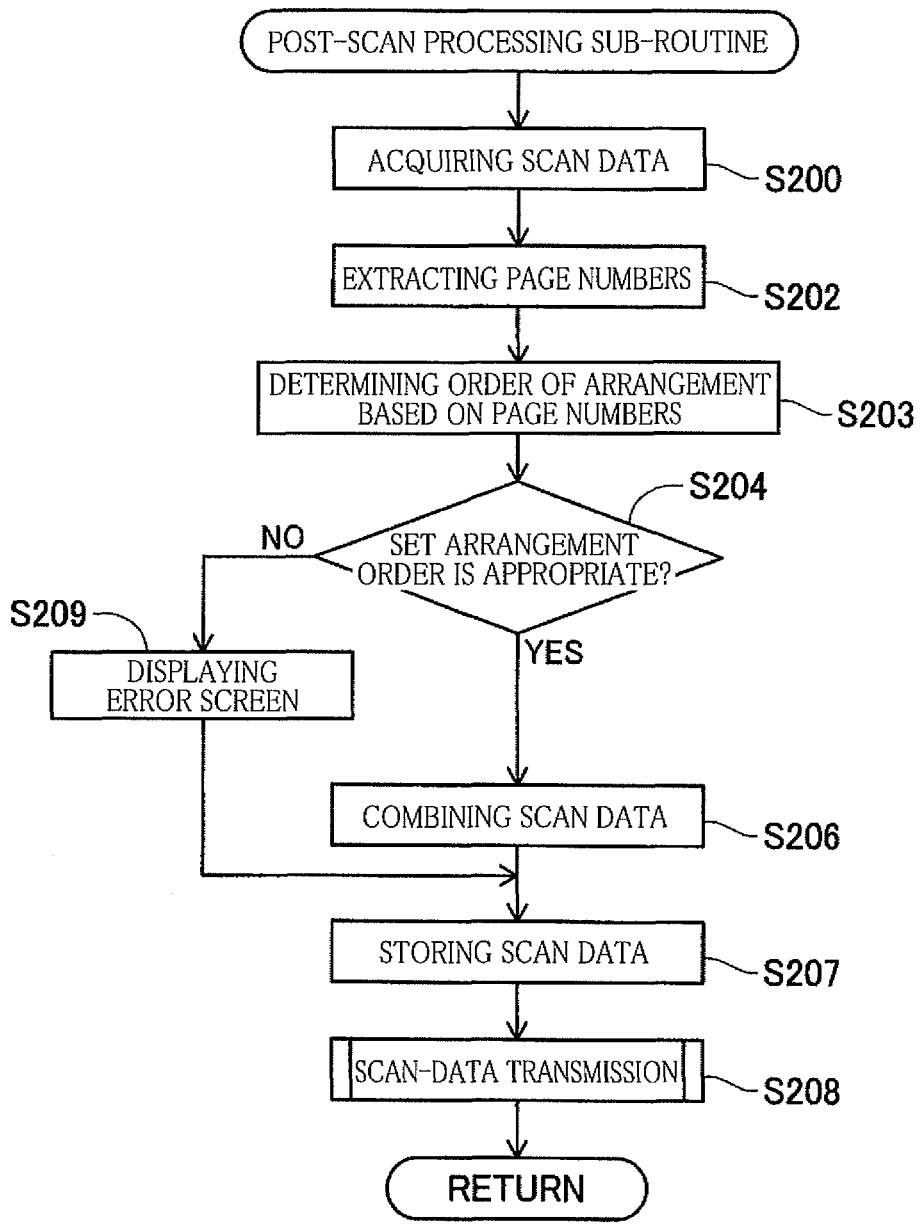
FIG. 18 is a flow chart illustrating processings executed by the scanner 10.

The post-scan processing sub-routine illustrated in FIG. 18 begins with S200 at which the CPU 12 acquires scan data from the multi-scan scanners. The CPU 12 at S202 analyzes the self-created scan data and the acquired scan data as described above to extract information about the page numbers from the self-created scan data and the acquired scan data. The CPU 12 at S203 determines the order of arrangement of the self-created scan data and the acquired scan data based on the extracted information about the page numbers. The CPU 12 at S204 determines whether the set arrangement order is appropriate or not based on the page-number arrangement order and the set arrangement order.

When the set arrangement order is appropriate (S204: YES), the CPU 12 at S206 combines the self-created scan data and the acquired scan data with each other in the set arrangement order, and this flow goes to S207. When the set arrangement order is not appropriate (S204: NO), an error screen is displayed on the panel 16 of the scanner 10 at S209, and this flow goes to S207. At S207, the combined scan data is stored into the data storage area 28 when a positive (YES) decision is made at S204, and the scan data not combined is stored into the data storage area 28 when a negative decision (NO) is made at S204, and this flow goes to S208. At S208, a scan-data transmission sub-routine is executed.

Figure 19:
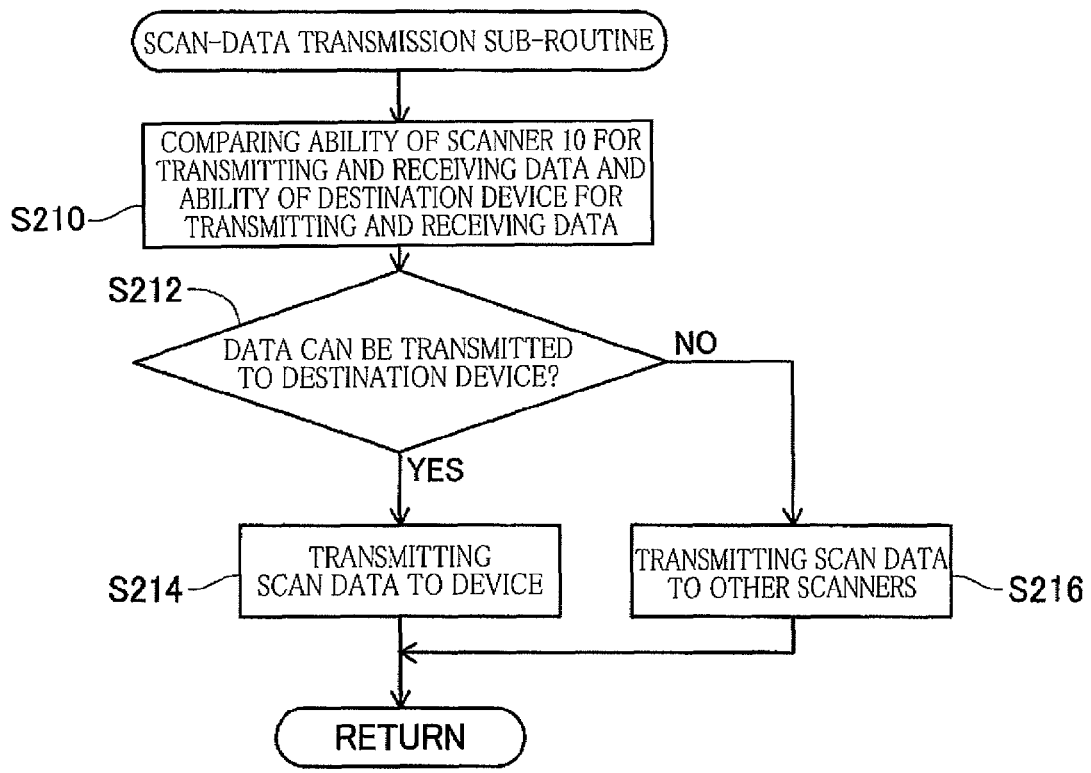
FIG. 19 is a flow chart illustrating processings executed by the scanner 10.

The scan-data transmission sub-routine illustrated in FIG. 19 begins with S210 at which the CPU 12 compares an ability of the scanner 10 for transmitting and receiving data and an ability of a device set as the destination of transmission for transmitting and receiving data with each other. Based on this comparison, the CPU 12 at S212 determines whether the scanner 10 can transmit the combined scan data to the device set as the destination of transmission or not.

When the scanner 10 can transmit the combined scan data to the device set as the destination of transmission (S212: YES), the combined scan data is at S214 transmitted to the device by using the communication information. It is noted that the combined scan data can be transmitted to the device as the destination of transmission when the positive decision (YES) is made at S204. When the negative decision (NO) is made at S204, the scan data not combined is transmitted to the device as the destination of transmission. When the scanner 10 cannot transmit the combined scan data to the device set as the destination of transmission (S212: NO), the combined scan data is at S216 transmitted to the other scanners 30, 50, 52 communicable with the device. It is noted that the combined scan data can be transmitted to the other scanners 30, 50, 52 communicable with the device when the positive decision (YES) is made at S204. When the negative decision (NO) is made at S204, the scan data not combined is transmitted to the other scanners 30, 50, 52 communicable with the device. When the combined scan data is transmitted to the device or the other scanners 30, 50, 52, the processings of the control program 26 are finished.

It is noted that when the start button 78 displayed on the start screen 72 is operated at S148 (S148: NO) or when there is no scanner on which the documents are set among the scanners 30, 50, 52 at S154 (S154: NO), the individual scan processing is executed at S176, and the processings of the control program 26 are finished.

Functional Configuration of CPU

In view of the processings executed by the CPU 12, the CPU 12 of the scanner 10 which executes the control program 26 can be considered to have a functional configuration illustrated in FIG. 2. As illustrated in FIG. 2, the CPU 12 includes an inquiry transmitter 120, a response receiver 122, a scanner selector 124, a scan instruction transmitter 126, a scan data acquirer 128, an associator 130, a first determiner 132, a page number acquirer 134, a second determiner 136, a first judging device 138, a notifier 140, a transmitter 142, a storing device 144, an identification information displaying device 146, and a setting value displaying device 148.

In view of the processings executed by the CPU 32, the CPU 32 of each of the scanners 30, 50, 52 which executes the control program 46 can be considered to have a functional configuration illustrated in FIG. 1. As illustrated in FIG. 1, the CPU 32 includes an inquiry receiver 150 and a response transmitter 152.

The inquiry transmitter 120 is a functional portion which executes the processing at S150 in the control program 26. The response receiver 122 is a functional portion which executes the processing at S152 in the control program 26. The scanner selector 124 is a functional portion which executes the processing at S184 in the control program 26. The scan instruction transmitter 126 is a functional portion which executes the processing at S166 in the control program 26. The scan data acquirer 128 is a functional portion which executes the processing at S200 in the control program 26. The associator 130 is a functional portion which executes the processing at S206 in the control program 26. The first determiner 132 is a functional portion which executes the processing at S156 in the control program 26. The page number acquirer 134 is a functional portion which executes the processing at S202 in the control program 26. The second determiner 136 is a functional portion which executes the processing at S203 in the control program 26. The first judging device 138 is a functional portion which executes the processing at S204 in the control program 26. The notifier 140 is a functional portion which executes the processing at S209 in the control program 26. The transmitter 142 is a functional portion which executes the processings at S214 and S216 in the control program 26. The storing device 144 is a functional portion which executes the processing at S207 in the control program 26. The identification information displaying device 146 is a functional portion which executes the processing at S158 in the control program 26. The setting value displaying device 148 is a functional portion which executes the processing at S182 in the control program 26. The inquiry receiver 150 is a functional portion which executes the processing at S108 in the control program 46. The response transmitter 152 is a functional portion which executes the processing at S110 in the control program 46.

Second Embodiment

Figure 20:
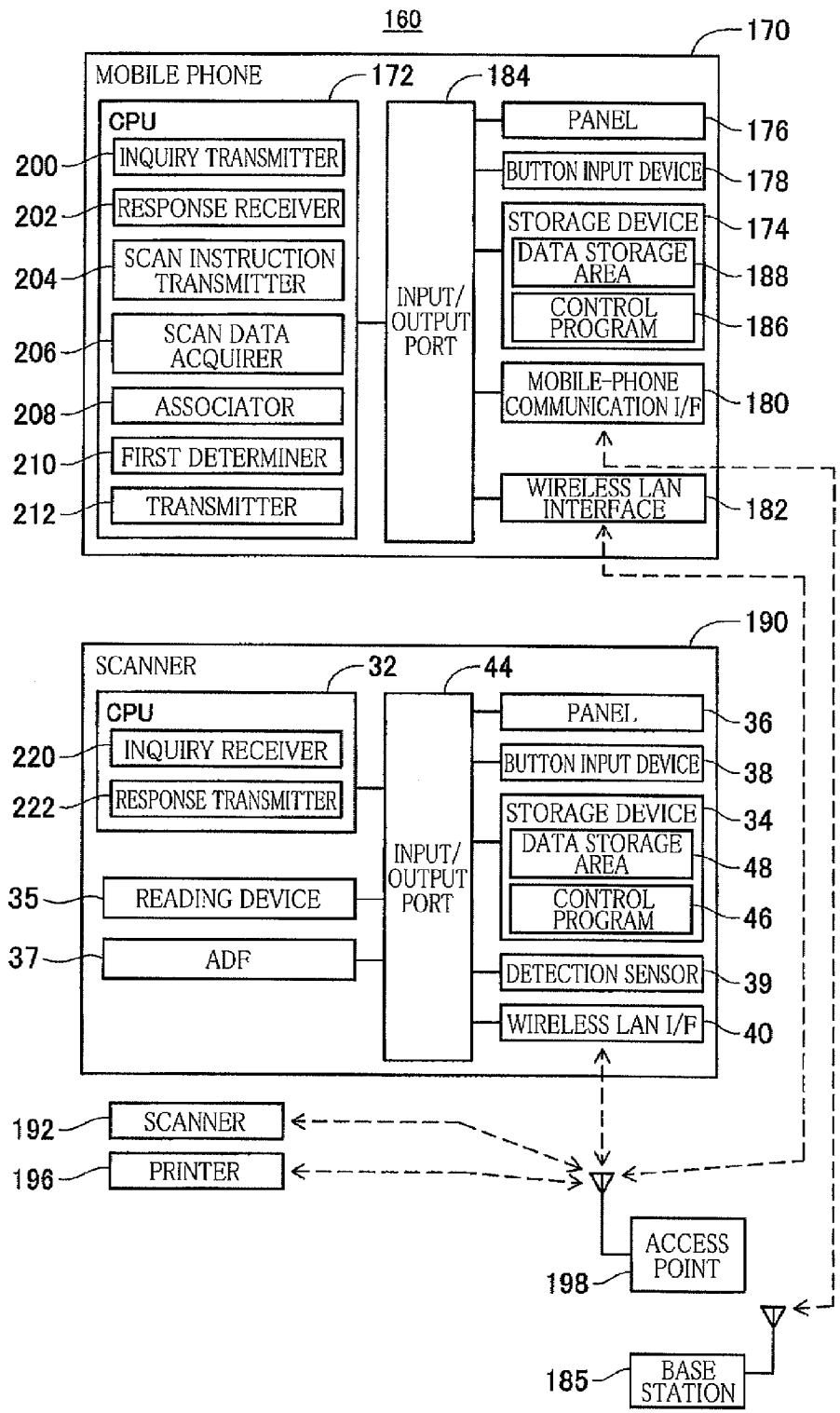
FIG. 20 is a block diagram illustrating a communication system 160 in a second embodiment.

There will be next explained a communication system 160 in a second embodiment. As illustrated in FIG. 20, the communication system 160 includes a mobile phone 170 (as one example of the information processing device), a scanner 190 (as one example of the scanner), a scanner 192 (as one example of the scanner), a printer 196, and an access point 198.

Each of the mobile phone 170, the scanners 190, 192, and the printer 196 functions as a well-known wireless-LAN terminal device and is capable of transmitting and receiving data to and from each other via the access point 198. The scanners 190, 192 have the same structure which is the same as that of the scanner 30 in the first embodiment. Accordingly, the same reference numerals as used in the scanner 30 are used to designate the corresponding elements of each of the scanners 190, 192, and an explanation of which is dispensed with. It is noted that the printer 196 prints an image based on scan data created by the scanners 190, 192.

There will be next explained a structure of the mobile phone 170. The mobile phone 170 includes a CPU 172 (as one example of the controller and the computer), a storage device 174, a panel 176 (as one example of the display), a button input device 178 (as one example of the input device), a mobile-phone communication I/F 180, and a wireless LAN interface 182 (as one example of the communication device). These devices can communicate with each other via an input/output port 184.

The mobile-phone communication I/F 180 performs wireless communication with a base station 185 according to a communication method of the mobile phone. With this configuration, when the mobile phone 170 accesses the base station 185 and is allowed to perform the wireless communication according to the communication method of the mobile phone, the mobile phone 170 can perform data communication via the base station 185.

The wireless LAN interface 182 is similar in configuration to the wireless LAN interface 20 of the scanner 10 in the first embodiment. Accordingly, when the mobile phone 170 accesses the access point 198 and is allowed to perform the wireless communication, the mobile phone 170 can perform data communication with the scanners 190, 192 and the printer 196 via the access point 198.

The CPU 172 executes processings according to a control program 186 (as one example of the communication program) stored in the storage device 174. The control program 186 is for causing each of the scanners 190, 192 to execute a scan processing and causing the CPU 172 to provide instructions for transmitting scan data created in the scan processing to the printer 196. In the following explanation, the CPU 172 which executes a program such as the control program 186 may be described simply by the name of program. For example, wordings "the control program 186 executes" may mean wordings "the CPU 172 executing the control program 186 executes".

The storage device 174 includes a data storage area 188. The data storage area 188 is an area for storing scan data acquired from, e.g., the scanners 190, 192 and data required for execution of the control program 186, for example. It is noted that the storage device 174 is constituted by devices including a RAM, a ROM, a flash memory, a HDD, and a buffer included in the CPU 172.

The panel 176 includes a display surface for displaying various kinds of functions of the mobile phone 170. The button input device 178 is constituted integrally with the panel 176 to receive a button operation of the user.

Multi-Scan Processing in Communication System 160

In the communication system 1 in the first embodiment, the scan processing is executed by the scanner 10 which executes the combining processing for combining the scan data. In the communication system 160 in the second embodiment, however, the mobile phone 170 executes the combining processing for combining the scan data but does not execute the scan processing. That is, while the scanner 10 in the first embodiment combines the self-created scan data and the acquired scan data with each other, the mobile phone 170 acquires scan data from each of the scanners 190, 192 and combines the plurality of acquired scan data with each other. Also, while the order of setting of the document groups is identified based on the after-setting elapsed time in the communication system 1, the order of setting of the document groups is identified in another method in the communication system 160. Except these differences, the multi-scan processing in the communication system 160 is similar to the multi-scan processing in the communication system 1, and an explanation of the same processings are simplified or omitted.

In the communication system 160, an inquiry about whether the scanning is being performed or not is transmitted from the mobile phone 170 to the scanners 190, 192. When the scanning is being performed, each of the scanners 190, 192 having received the inquiry sends the mobile phone 170 a response indicating that the scanning is being performed. When the scanning is not being performed, each of the scanners 190, 192 having received the inquiry sends the mobile phone 170 a response indicating that the scanning is not being performed.

The mobile phone 170 transmits a request of transmission of document set information, to the scanners 190, 192 having transmitted the response indicating that the scanning is not being performed. This document set information is transmitted to the mobile phone 170 from the scanner at the point in time when the documents are set on the ADF of the scanner. That is, the mobile phone 170 requests each of the scanners 190, 192 having transmitted the response indicating that the scanning is not being performed, to transmit information indicating that the documents have been set, at the point in time when the documents are set, when the documents are set on the ADF. This information indicating that the documents have been set is the document set information.

Each of the scanners 190, 192 having received the request of transmission of the document set information uses the detection sensor 39 to determine whether the documents are set on the ADF or not. When the documents are set on the ADF, each of the scanners 190, 192 transmits the document set information to the mobile phone 170 at the point in time when the documents are set. In the case where the documents are not set on the ADF at the point in time when a predetermined length of time is elapsed from the reception of the request of transmission of the document set information, the multi-scan processing is not to be executed by the scanner having received the request of transmission of the document set information.

Upon receiving the document set information, the mobile phone 170 sets or assigns an ordinal number of reception of the document set information to the scanner having transmitted the document set information. Specifically, in the case where the document set information is received from the scanner 190 at 10 o'clock, and the document set information is received from the scanner 192 at 10:00:20, for example, the scanner 190 is set as a first scanner, and the scanner 192 as a second scanner. The mobile phone 170 identifies the order of setting of the document groups according to the set ordinal numbers.

After setting the documents on the scanners 190, 192, the user having a plan of the multi-scan processing operates the button input device 178 of the mobile phone 170 to input a print command to the mobile phone 170. When this print command is input, the mobile phone 170 transmits the scan instruction to the scanners 190, 192 having transmitted the document set information. Each of the scanners 190, 192 having received the scan instruction executes the scan processing.

Each of the scanners 190, 192 having executed the scan processing transmits the scan data created in the scan processing to the mobile phone 170. Upon receiving the scan data from the scanners 190, 192, the mobile phone 170 combines the plurality of received scan data in the identified order of setting of the document groups. The mobile phone 170 transmits the combined scan data to the printer 196.

Also in the communication system 160 as described above, the documents are set on the plurality of scanners 190, 192, then the scan processing is executed by each of the scanners 190, 192, and the plurality of scan data created in the scan processing are combined with each other. This configuration improves operability of the scan system. Also in the communication system 160, the plurality of scan data are arranged in the order of setting of the documents on the scanners. This configuration can eliminate the need to input the order of arrangement of the plurality of scan data, resulting in reduction in the number of operations of the user.

In the communication system 160, as described above, the order of setting of the document groups is identified based on the document set information transmitted from the scanners 190, 192 to the mobile phone 170. With this configuration, the order of setting of the document groups can be identified even in the case where the scanners 190, 192 do not have the clock function or the time measurement function. Accordingly, various scanners can be used to execute the multi-scan processing.

Control Program

The above-described multi-scan processing is executed by (i) execution of the control program 186 by the CPU 172 of the mobile phone 170 and (ii) execution of the control program 46 by the CPU 32 of each of the scanners 190, 192. There will be explained, with reference to FIGS. 21 and 22, a flow when the control program 186 is executed by the CPU 172 of the mobile phone 170, and there will be explained, with reference to FIGS. 23 and 24, a flow when the control program 46 is executed by the CPU 32 of each of the scanners 190, 192.

Figure 21:
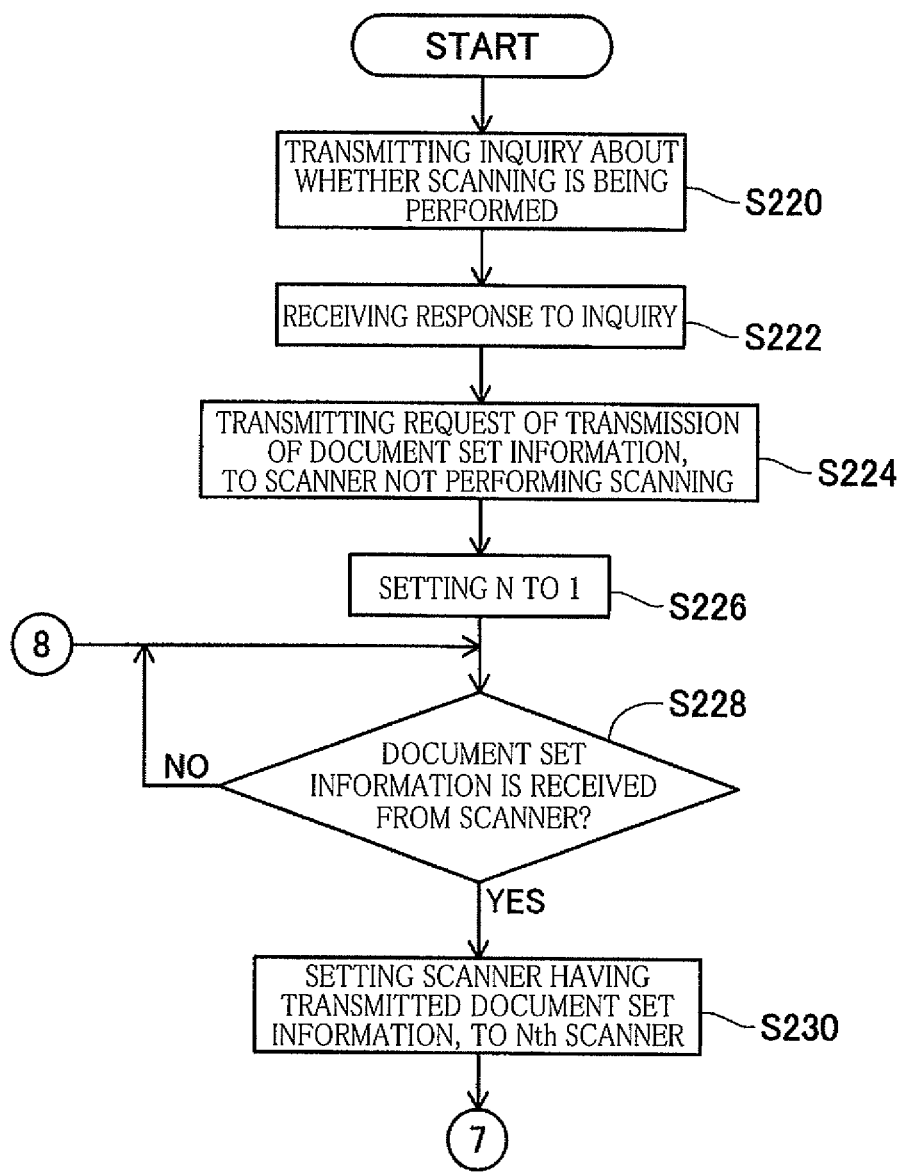
FIG. 21 is a flow chart illustrating processings executed by a mobile phone 170.
Figure 22:
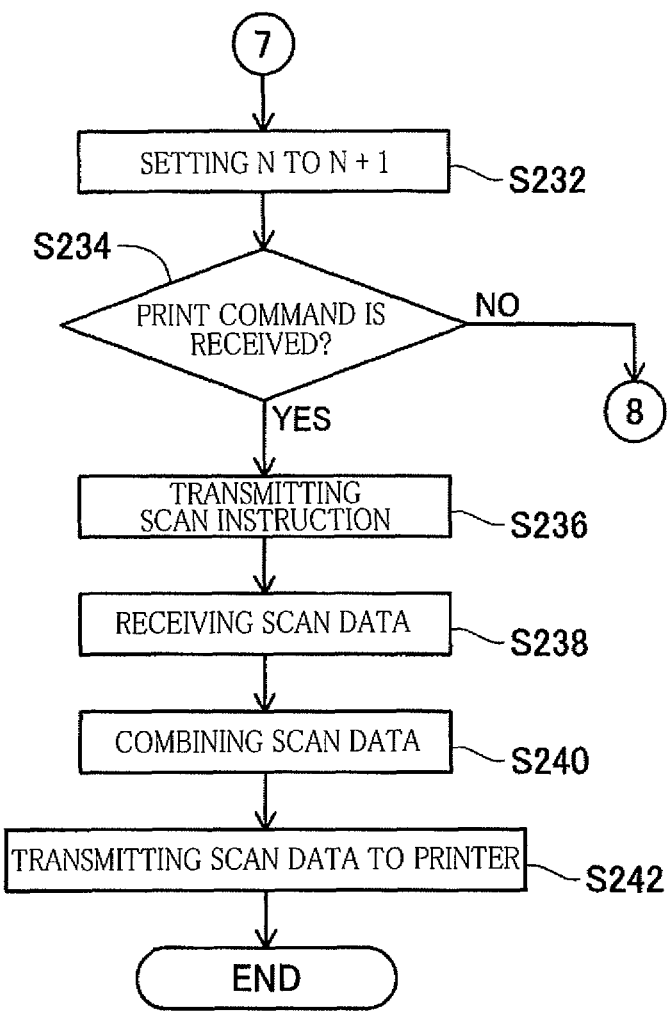
FIG. 22 is a flow chart illustrating processings executed by the mobile phone 170.

When the control program 186 is executed by the CPU 172 of the mobile phone 170, the flow illustrated in FIG. 21 begins with S220 at which the mobile phone 170 sends the scanners 190, 192 the inquiry about whether the scanning is being performed or not. The CPU 172 at S222 receives, from the scanners 190, 192, information about whether the scanning is being performed or not, as the response to the inquiry. The CPU 172 at S224 transmits the request of transmission of the document set information, to the scanners 190, 192 not performing the scanning.

At S226, the CPU 172 sets a variable N to one. The CPU 172 at S228 determines whether the document set information has been received from the scanners 190, 192 or not. When the document set information is not received from the scanners 190, 192 (S228: NO), the processing at S228 is repeated. When the document set information is received from the scanners 190, 192 (S228: YES), the CPU 172 at S230 sets the scanner having transmitted the received document set information, to an Nth scanner.

The CPU 172 sets the variable N to N+1 at S232. The CPU 172 at S234 determines whether a print command has been received or not. When the print command is not received (S234: NO), this flow returns to S228. When the print command is received (S234: YES), the scan instruction is at S236 transmitted from the mobile phone 170 to the scanners 190, 192 having transmitted the document set information. The CPU 172 at S238 receives scan data from the scanners 190, 192 to which the scan instruction has been transmitted.

The CPU 172 at S240 arranges the plurality of received scan data according to the numbers N respectively assigned to the scanners having transmitted the document set information and combines the scan data with each other in the order of arrangement. The combined scan data is at S242 transmitted from the mobile phone 170 to the printer 196, and the processings of the control program 186 are finished.

Figure 23:
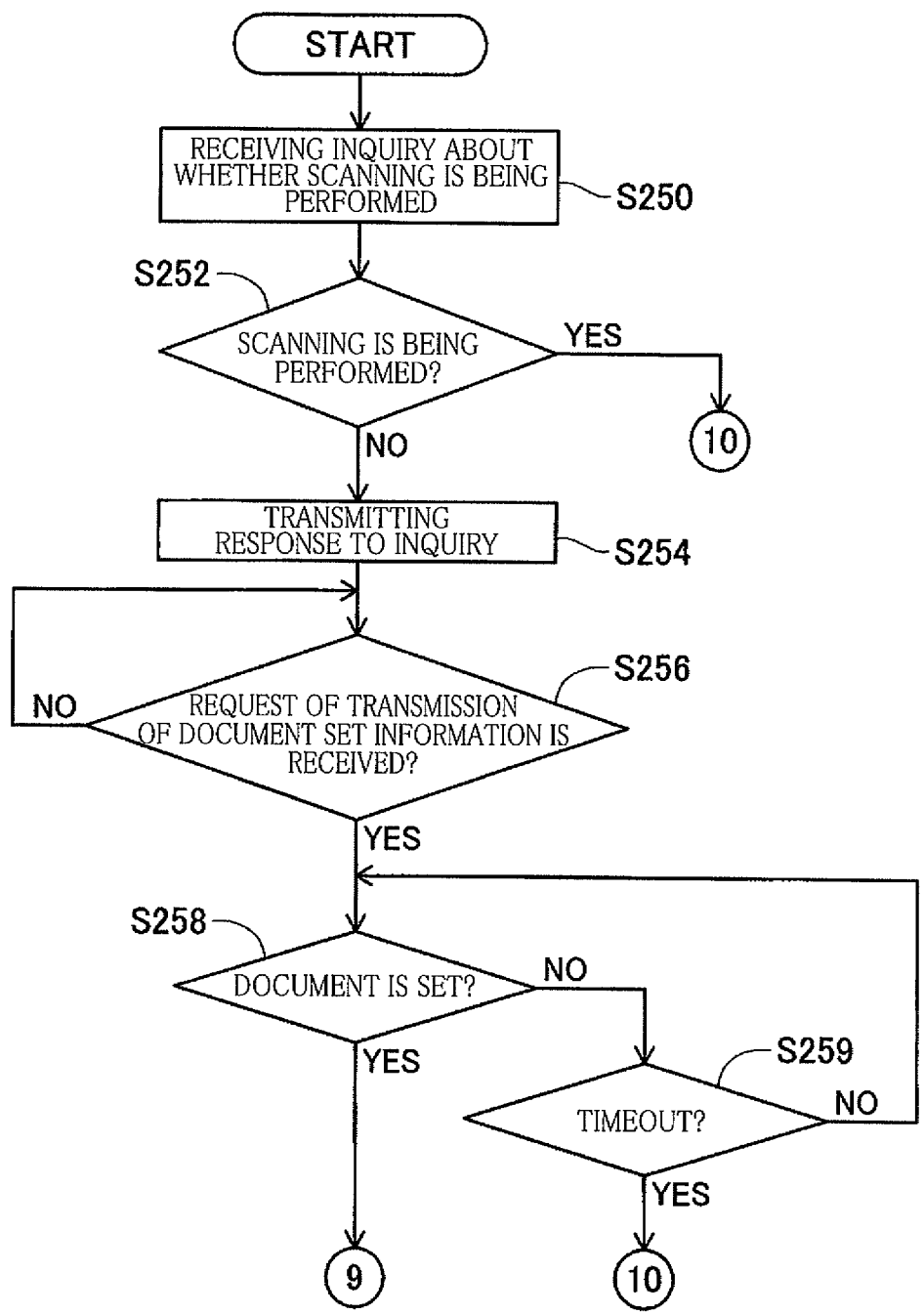
FIG. 23 is a flow chart illustrating processings executed by scanners 190, 192.
Figure 24:
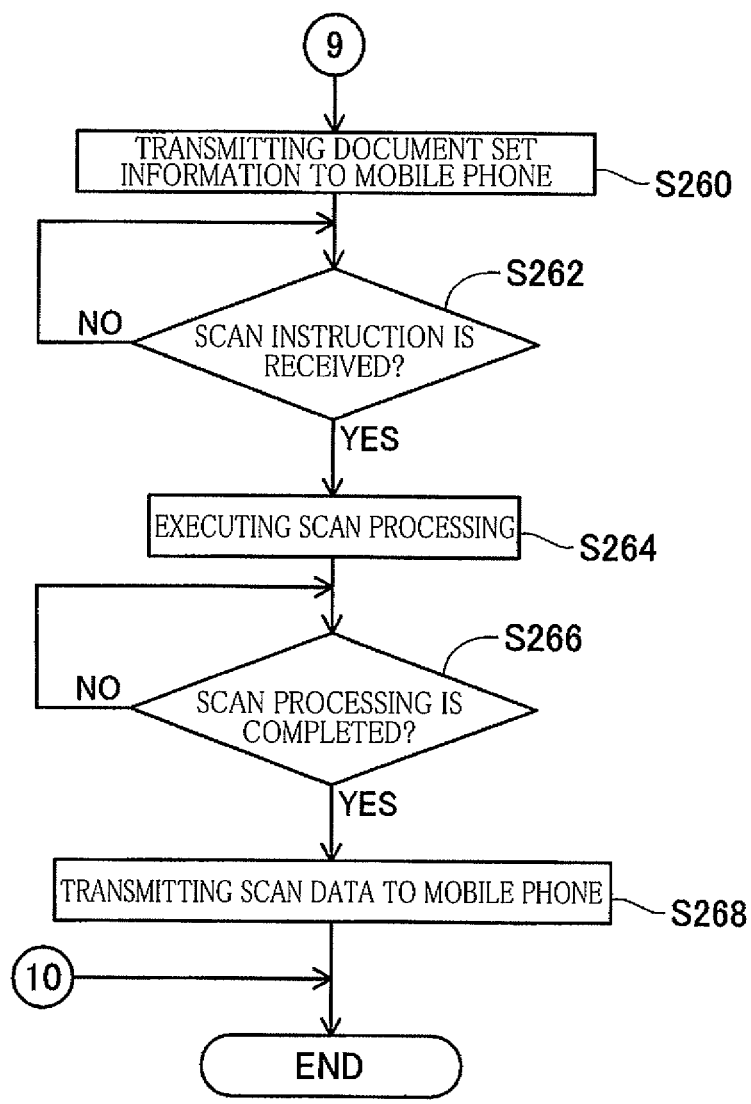
FIG. 24 is a flow chart illustrating processings executed by the scanners 190, 192.

When the control program 46 is executed by the CPU 32 of each of the scanners 190, 192, the flow illustrated in FIG. 23 begins with S250 at which the CPU 32 receives, from the mobile phone 170, the inquiry about whether the scanning is being performed or not. The CPU 32 at S252 determines whether the scanning is being performed or not. When the scanning is being performed (S252: YES), the processings of the control program 46 are finished. When the scanning is not being performed (S252: NO), the response to the inquiry is at S254 transmitted to the mobile phone 170. That is, information indicating that the scanning is not being performed is transmitted to the mobile phone 170.

The CPU 32 at S256 determines whether the request of transmission of the document set information has been received or not. When the request of transmission of the document set information is not received (S256: NO), the processing at S256 is repeated. When the request of transmission of the document set information is received (S256: YES), the CPU 32 at 258 determines whether the documents have been set on the ADF or not. When the documents are not set on the ADF (S258: NO), the CPU 32 at 259 determines whether the predetermined length of time is elapsed from the reception of the request of transmission of the document set information or not.

When the predetermined length of time is not elapsed from the reception of the request of transmission of the document set information (S259: NO), this flow returns to S258. When the predetermined length of time is elapsed from the reception of the request of transmission of the document set information (S259: YES), the processings of the control program 46 are finished.

When the documents are set on the ADF at S258 (S258: YES), the document set information is at S260 transmitted to the mobile phone 170. The CPU 32 at S262 determines whether the scan instruction has been received from the mobile phone 170 or not. When the scan instruction is not received (S262: NO), the processing at S262 is repeated. When the scan instruction is received (S262: YES), the CPU 32 at S264 executes the scan processing.

The CPU 32 at 266 determines whether the scan processing is completed or not. When the scan processing is not completed (S266: NO), the processing at S266 is repeated. When the scan processing is completed (S266: YES), the scan data created in the scan processing is at S268 transmitted to the mobile phone 170.

Functional Configuration of CPU

In view of the processings executed by the CPU 172, the CPU 172 of the mobile phone 170 which executes the control program 186 can be considered to have a functional configuration illustrated in FIG. 20. As illustrated in FIG. 20, the CPU 172 includes an inquiry transmitter 200, a response receiver 202, a scan instruction transmitter 204, a scan data acquirer 206, an associator 208, a first determiner 210, and a transmitter 212.

In view of the processings executed by the CPU 32, the CPU 32 of each of the scanners 190, 192 which executes the control program 46 can be considered to have a functional configuration illustrated in FIG. 20. As illustrated in FIG. 20, the CPU 32 includes an inquiry receiver 220 and a response transmitter 222.

The inquiry transmitter 200 is a functional portion which executes the processing at S224 in the control program 186. The response receiver 202 is a functional portion which executes the processing at S228 in the control program 186. The scan instruction transmitter 204 is a functional portion which executes the processing at S236 in the control program 186. The scan data acquirer 206 is a functional portion which executes the processing at S238 in the control program 186. The associator 208 is a functional portion which executes the processing at S240 in the control program 186. The first determiner 210 is a functional portion which executes the processing at S230 in the control program 186. The transmitter 212 is a functional portion which executes the processing at S242 in the control program 186. The inquiry receiver 220 is a functional portion which executes the processing at S250 in the control program 46. The response transmitter 222 is a functional portion which executes the processing at S260 in the control program 46.

While the embodiments have been described above, it is to be understood that the disclosure is not limited to the details of the illustrated embodiments, but may be embodied with various changes and modifications, which may occur to those skilled in the art, without departing from the spirit and scope of the disclosure. Specifically, for example, while the scan data created by, e.g., the scanners 30, 190 are transmitted to the scanner 10 or the mobile phone 170 and thereafter transmitted by the scanner 10 or the mobile phone 170 to, e.g., the printers 60, 196 in the above-described embodiments, the scan data created by, e.g., the scanners 30, 190 may be directly transmitted to, e.g., the printers 60, 196.

Specifically, for example, in the communication system 160 in the second embodiment, after the user inputs the print command into the mobile phone 170, the mobile phone 170 sends the scanners 190, 192 not only the scan instruction but also an instruction for transmitting the scan data created in the scan processing to the printer 196. As a result, the scanners 190, 192 execute the scan processing and transmit the scan data created in the scan processing to the printer 196. Also, the mobile phone 170 not only transmits the instruction to the scanners 190, 192 but also sends the printer 196 the order of arrangement of the scan data, i.e., the order of setting of the document groups which is identified by the mobile phone 170. As a result, the printer 196 receives the plurality of scan data from the scanners 190, 192 and combines the plurality of scan data in the order of setting of the document groups. As thus described, the same effects as obtained in the above-described embodiments can be obtained also by transmitting the scan data created by, e.g., the scanners 30, 190, directly to, e.g., the printers 60, 196.

The processing for transmitting the scan data directly to the printer 196 is executed by (i) execution of the control program 186 by the CPU 172 of the mobile phone 170 and (ii) execution of the control program 46 by the CPU 32 of each of the scanners 190, 192. There will be explained, with reference to FIG. 25, a flow when the control program 186 is executed by the CPU 172 of the mobile phone 170, and there will be explained, with reference to FIG. 26, a flow when the control program 46 is executed by the CPU 32 of each of the scanners 190, 192. It is noted that these flows are partly similar to the flows in the second embodiment, and an explanation is given using FIGS. 21 and 23 which are used for the explanation of the flows in the second embodiment.

Figure 25:
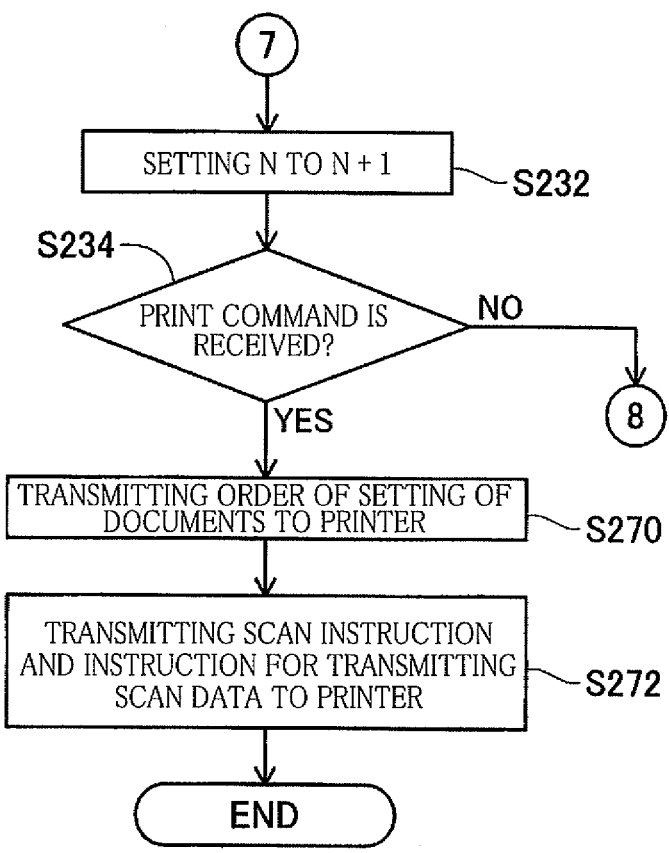
FIG. 25 is a flow chart illustrating processings executed by a mobile phone 170 in a modification.

When the control program 186 is executed by the CPU 172 of the mobile phone 170, the processings at S220-S234 illustrated in FIGS. 21 and 25 are executed as in the processings at S220-S234 in the second embodiment. When the print command is received at S234 (S234: YES), the identified order of setting of the document groups is transmitted to the printer 196 at S270. The CPU 172 at S272 sends the scanners 190, 192 the scan instruction and an instruction for transmitting the scan data to the printer 196. As a result, the processings of the control program 186 are finished.

Figure 26:
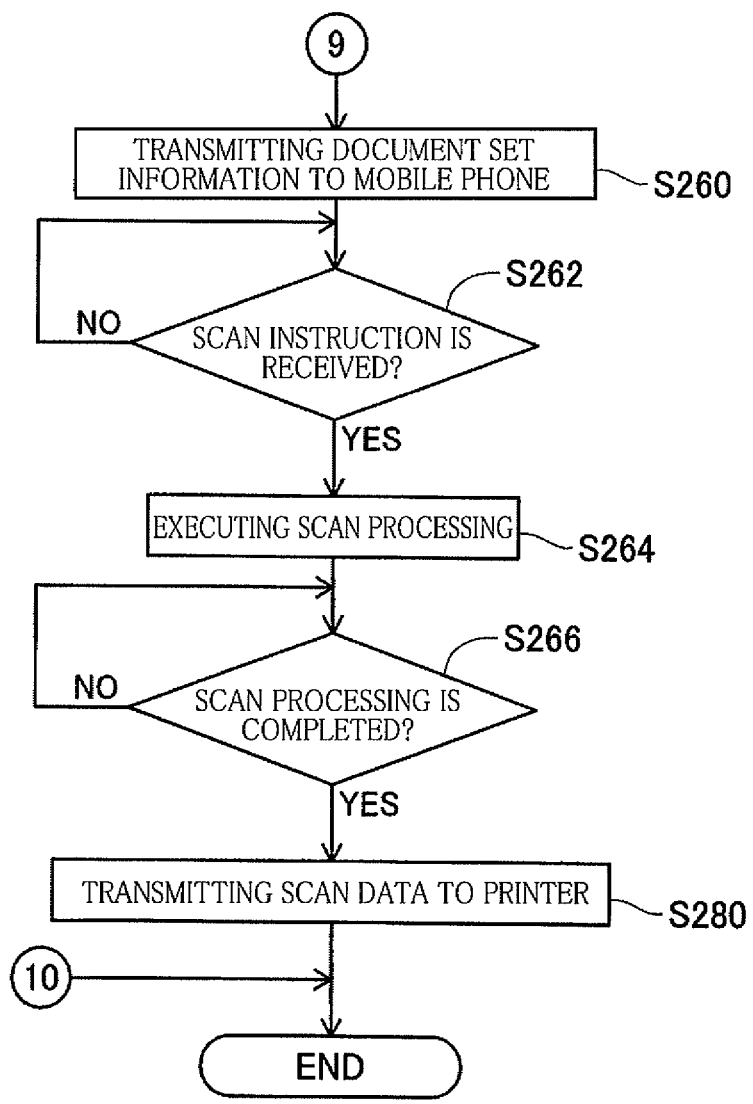
FIG. 26 is a flow chart illustrating processings executed by the scanners 190, 192 in a modification.

Also, when the control program 46 is executed by the CPU 32 of each of the scanners 190, 192, the processings at S250-S266 illustrated in FIGS. 23 and 26 and executed as in the processings at S250-S266 in the second embodiment. When the scan processing is completed at S266 (S266: YES), the scan data is transmitted to the printer 196 at S280, and the processings of the control program 46 are finished.

In the above-described first embodiment, the scanner 10 acquires the scan data from the scanner 30 and combines the acquired scan data and the scan data created by the scanner 10, and the combined scan data is transmitted to the printer 60. However, as in the above-described second embodiment, the scanner 10 may transmit the scan data acquired from the scanner 30 and the scan data created by the scanner 10 to the printer 60 and transmit the order of printing of the scan data to the printer 60.

In the above-described embodiment, the processings illustrated in FIGS. 12-19 and FIGS. 21-26 are executed by, e.g., the CPU 12. These processings do not need to be executed by, e.g., the CPU 12 and may be executed by an ASIC or another or other similar logical integrated circuits and may be executed by cooperation of the CPU, the ASIC, and the logical integrated circuit, for example.

What is claimed is:

1. A non-transitory storage medium storing a plurality of instructions executable by a computer of an information processing device, the information processing device comprising: a communication device communicable with a plurality of scanners; and an input device configured to receive a signal which is output in response to a user operation, the plurality of instructions, when executed by the computer, causing the information processing device to execute:

an inquiry processing in which an inquiry about whether a reading object is ready to be scanned is transmitted to each of the plurality of scanners via the communication device, the reading object being ready to be scanned upon detection that the reading object is placed on a document support;

a response receiving processing in which a response containing first information indicating that the reading object is on the document support is received as a response to the inquiry transmitted in the inquiry processing;

a selection processing in which at least one scanner is selected, based on the signal input from the input device, from among at least one of the plurality of scanners which has transmitted the response containing the first information; and an instruction transmitting processing in which a scan instruction is transmitted via the communication device to the at least one scanner selected in the selection processing.

2. The non-transitory storage medium according to claim 1, wherein when executed by the computer, the plurality of instructions cause the information processing device to execute:

the selection processing in which a plurality of scanners are selected based on the signal input from the input device from among a plurality of scanners having transmitted the response containing the first information; and the instruction transmitting processing in which a plurality of scan instructions are transmitted via the communication device to the plurality of scanners selected in the selection processing.

3. The non-transitory storage medium according to claim 2, wherein when executed by the computer, the plurality of instructions cause the information processing device to execute an associating processing in which a plurality of scan data created by the plurality of scanners based on the plurality of scan instructions transmitted in the instruction transmitting processing are associated with each other.

4. The non-transitory storage medium according to claim 3, wherein when executed by the computer, the plurality of instructions cause the information processing device to execute:

a scan-data acquiring processing in which the plurality of scan data created based on the plurality of scan instructions are acquired via the communication device; and the associating processing in which the plurality of scan data acquired in the scan-data acquiring processing are associated with each other and combined with each other.

5. The non-transitory storage medium according to claim 3, wherein when executed by the computer, the plurality of instructions cause the information processing device to execute:

the response receiving processing in which the response is received from each of ones of the plurality of scanners, the reading document being placed on the document support of each of the ones of the plurality of scanners, the response containing the first information and second information, the second information being for determining an ordinal number of placement of the reading object on the document support of each of the ones of the plurality of scanners;

a first determination processing in which an order of arrangement of the plurality of scan data is determined based on the second information received in the response receiving processing; and the associating processing in which the plurality of scan data are associated with each other based on the order of arrangement of the plurality of scan data which is determined in the first determination processing.

6. The non-transitory storage medium according to claim 3, wherein when executed by the computer, the plurality of instructions cause the information processing device to execute:

the response receiving processing in which the response containing the first information is received via the communication device from each of ones of the plurality of scanners, the reading document being placed on the document support of each of the ones of the plurality of scanners;

a first determination processing in which an order of arrangement of the plurality of scan data is determined based on an ordinal number of reception of the response containing the first information from each of the ones of the plurality of scanners; and the associating processing in which the plurality of scan data are associated with each other based on the order of arrangement of the plurality of scan data which is determined in the first determination processing.

7. The non-transitory storage medium according to claim 5, wherein when executed by the computer, the plurality of instructions cause the information processing device to execute:

a page-number acquiring processing in which page information is acquired from the plurality of scan data associated with each other, the page information indicating a page number assigned to the reading object placed on the document support of each of the ones of the plurality of scanners;

a second determination processing in which the order of arrangement of the plurality of scan data is determined based on the page information acquired in the page-number acquiring processing; and a notifying processing in which when the order of arrangement of the plurality of scan data which is determined in the first determination processing differs from the order of arrangement of the plurality of scan data which is determined in the second determination processing, information indicating that the order of arrangement of the plurality of scan data which is determined in the first determination processing differs from the order of arrangement of the plurality of scan data which is determined in the second determination processing is notified.

8. The non-transitory storage medium according to claim 5, wherein when executed by the computer, the plurality of instructions cause the information processing device to execute:

at least one of (i) a data transmission processing in which the plurality of scan data associated with each other in the associating processing are transmitted to a designated external device and (ii) a storing processing in which the plurality of scan data are stored into a storage;

a page-number acquiring processing in which page information is acquired from the plurality of scan data associated with each other, the page information indicating a page number assigned to the reading object placed on the document support of each of the ones of the plurality of scanners;

a second determination processing in which the order of arrangement of the plurality of scan data is determined based on the page information acquired in the page-number acquiring processing;

the data transmission processing in which when the order of arrangement of the plurality of scan data which is determined in the first determination processing differs from the order of arrangement of the plurality of scan data which is determined in the second determination processing, the plurality of scan data are transmitted to the designated external device in a state in which the plurality of scan data are not associated with each other; and the storing processing in which when the order of arrangement of the plurality of scan data which is determined in the first determination processing differs from the order of arrangement of the plurality of scan data which is determined in the second determination processing, the plurality of scan data are stored into the storage in the state in which the plurality of scan data are not associated with each other.

9. The non-transitory storage medium according to claim 5, wherein when executed by the computer, the plurality of instructions cause the information processing device to execute an identification-information displaying processing in which a plurality of sets of identification information respectively for identifying the plurality of scanners having transmitted the response containing the first information are displayed on a display in the order of arrangement which is determined in the first determination processing.

10. The non-transitory storage medium according to claim 2, wherein when executed by the computer, the plurality of instructions cause the information processing device to execute a setting-value displaying processing in which at least one common setting value among a plurality of setting values for at least one setting item is displayed on a display, the at least one common setting value being common to all the plurality of scanners having transmitted the response containing the first information.

11. The non-transitory storage medium according to claim 2, wherein when executed by the computer, the plurality of instructions cause the information processing device to execute a setting-value-set displaying processing in which a set of predetermined setting values for each of a plurality of setting items are displayed on a display, the displayed set of predetermined setting values being stored in the at least one of the plurality of scanners which has transmitted the response containing the first information.

12. The non-transitory storage medium according to claim 1,
wherein the information processing device comprises an image sensor and a document support, and
wherein when executed by the computer, the plurality of instructions cause the information processing device to execute a scan processing in which scan data is created by reading an image, using the image sensor, recorded on a reading object placed on the document support.

13. The non-transitory storage medium according to claim 12, wherein when executed by the computer, the plurality of instructions cause the information processing device to execute an associating processing in which at least one scan data created by the at least one scanner based on at least one scan instruction transmitted in the instruction transmitting processing and scan data created in the scan processing are associated with each other.

14. The non-transitory storage medium according to claim 13, wherein when executed by the computer, the plurality of instructions cause the information processing device to execute:

a scan-data acquiring processing in which the at least one scan data created based on the at least one scan instruction is acquired via the communication device; and the associating processing in which the at least one scan data acquired in the scan-data acquiring processing and the scan data created in the scan processing are associated with each other and combined with each other.

15. The non-transitory storage medium according to claim 13, wherein when executed by the computer, the plurality of instructions cause the information processing device to execute:

a data transmission processing in which the at least one scan data and the scan data associated with each other in the associating processing are transmitted via the communication device to a stored external device, a destination of the stored external device being stored in a certain scanner which is one of the at least one scanner having transmitted the response containing the first information; and a data-transmission instructing processing in which when an input indicating the designation of the stored external device is received, and when the stored external device is not communicable with the information processing device via the communication device, an instruction for transmitting the at least one scan data and the scan data associated with each other to the external device is transmitted to the certain scanner.

16. The non-transitory storage medium according to claim 13, wherein when executed by the computer, the plurality of instructions cause the information processing device to execute:

the response receiving processing in which the response is received from each of at least one scanner of the plurality of scanners, the reading document being placed on the document support of each of the at least one scanner, the response containing the first information and second information for determining an ordinal number of placement of the reading object on the document support of each of the at least one scanner; and a first determination processing in which an order of arrangement of the at least one scan data and the scan data is determined based on the second information received in the response receiving processing and third information indicating a time at which a reading object is placed on the document support of the information processing device.

17. The non-transitory storage medium according to claim 13, wherein when executed by the computer, the plurality of instructions cause the information processing device to execute:

the response receiving processing in which the response containing the first information is received via the communication device from each of at least one scanner, the reading document being placed on the document support of each of the at least one scanner; and a first determination processing in which an order of arrangement of the at least one scan data and the scan data is determined based on a time at which the response containing the first information is received from the at least one scanner and a time at which the reading object is placed on the document support of the information processing device.

18. The non-transitory storage medium according to claim 16, wherein when executed by the computer, the plurality of instructions cause the information processing device to execute:

a page-number acquiring processing in which page information is acquired from the at least one scan data and the scan data, the page information indicating a page number assigned to the reading object placed on the document support of each of the at least one scanner and the information processing device;

a second determination processing in which the order of arrangement of the at least one scan data and the scan data is determined based on the page information acquired in the page-number acquiring processing; and a notifying processing in which when the order of arrangement which is determined by the second determination processing differs from the order of arrangement which is determined in the first determination processing, information indicating that the order of arrangement which is determined by the second determination processing differs from the order of arrangement which is determined in the first determination processing is notified.

19. The non-transitory storage medium according to claim 16, wherein when executed by the computer, the plurality of instructions cause the information processing device to execute:

at least one of (i) a data transmission processing in which the at least one scan data and the scan data are transmitted to a designated external device and (ii) a storing processing in which the at least one scan data and the scan data are stored into a storage;

a page-number acquiring processing in which page information is acquired from the at least one scan data and the scan data, the page information indicating a page number assigned to the reading object placed on the document support of each of the at least one scanner and the information processing device;

a second determination processing in which the order of arrangement of the at least one scan data and the scan data is determined based on the page information acquired in the page-number acquiring processing;

the data transmission processing in which when the order of arrangement which is determined by the second determination processing differs from the order of arrangement which is determined in the first determination processing, the at least one scan data and the scan data are transmitted to the designated external device in a state in which the at least one scan data and the scan data are not associated with each other; and the storing processing in which when the order of arrangement which is determined by the second determination processing differs from the order of arrangement which is determined in the first determination processing, the at least one scan data and the scan data are stored into the storage in the state in which the at least one scan data and the scan data are not associated with each other.

20. The non-transitory storage medium according to claim 16, wherein when executed by the computer, the plurality of instructions cause the information processing device to execute an identification-information displaying processing in which at least one identification information respectively for identifying the at least one scanner having transmitted the response containing the first information is displayed on a display in the order of arrangement which is determined in the first determination processing.

21. The non-transitory storage medium according to claim 12, wherein when executed by the computer, the plurality of instructions cause the information processing device to execute a setting-value displaying processing in which at least one common setting value among a plurality of setting values for at least one setting item is displayed on a display, and the at least one common setting value is common to all the at least one scanner having transmitted the response containing the first information and the information processing device.

22. The non-transitory storage medium according to claim 12, wherein when executed by the computer, the plurality of instructions cause the information processing device to execute a setting-value-set displaying processing in which in one of the at least one scanner having transmitted the response containing the first information, a set of predetermined setting values for each of a plurality of setting items for a scan processing are displayed on a display.

23. An information processing device, comprising:
a communication device configured to communicate with a plurality of scanners;
an input device configured to receive a signal which is output in response to a user operation; and
a controller configured to execute:
- an inquiry processing in which an inquiry about whether a reading object is ready to be scanned is transmitted to each of the plurality of scanners via the communication device, the reading object being ready to be scanned upon detection that the reading object is placed on a document support;
- a response receiving processing in which a response containing first information indicating that the reading object is on the document support is received as a response to the inquiry transmitted in the inquiry processing;
- a selection processing in which at least one scanner is selected, based on the signal input from the input device, from among at least one of the plurality of scanners which has transmitted the response containing the first information; and
- an instruction transmitting processing in which a scan instruction is transmitted via the communication device to the at least one scanner selected in the selection processing.

* * * * *